(12) United States Patent
Hayashi et al.

(10) Patent No.: US 12,497,538 B2
(45) Date of Patent: Dec. 16, 2025

(54) ALKALI-RESISTANT WATER REPELLENT MEMBER, METHOD FOR PRODUCING SAID WATER REPELLENT MEMBER, AND METHOD FOR IMPROVING ALKALI RESISTANCE AND WEAR RESISTANCE OF WATER REPELLENT MEMBER

(71) Applicant: Shin-Etsu Chemical Co., Ltd., Tokyo (JP)

(72) Inventors: Ryuto Hayashi, Annaka (JP); Yuji Yamane, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 896 days.

(21) Appl. No.: 17/772,745

(22) PCT Filed: Oct. 15, 2020

(86) PCT No.: PCT/JP2020/038844
§ 371 (c)(1),
(2) Date: Apr. 28, 2022

(87) PCT Pub. No.: WO2021/085149
PCT Pub. Date: May 6, 2021

(65) Prior Publication Data
US 2022/0389275 A1 Dec. 8, 2022

(30) Foreign Application Priority Data

Oct. 31, 2019 (JP) ................................. 2019-198889

(51) Int. Cl.
| | |
|---|---|
| *C09D 183/08* | (2006.01) |
| *C08G 65/00* | (2006.01) |
| *C08K 3/36* | (2006.01) |
| *C09D 5/16* | (2006.01) |
| *C09D 7/61* | (2018.01) |
| *C09D 183/14* | (2006.01) |

(52) U.S. Cl.
CPC ......... *C09D 183/08* (2013.01); *C08G 65/007* (2013.01); *C08K 3/36* (2013.01); *C09D 5/165* (2013.01); *C09D 7/61* (2018.01); *C09D 183/14* (2013.01); *C08K 2201/011* (2013.01)

(58) Field of Classification Search
CPC ...... C09D 183/14; C09D 5/165; C08G 5/007; C08G 5/336; B05D 2425/01; B05D 2401/10; B05D 2518/10; B05D 2601/28
See application file for complete search history.

(56) References Cited

U.S. PATENT DOCUMENTS

| | | | |
|---|---|---|---|
| 2007/0141114 A1* | 6/2007 | Muisener | ......... B29D 11/00346 |
| | | | 427/2.24 |
| 2007/0149746 A1 | 6/2007 | Yamane et al. | |
| 2007/0197758 A1 | 8/2007 | Yamane et al. | |
| 2008/0071042 A1 | 3/2008 | Yamane et al. | |
| 2010/0029889 A1 | 2/2010 | Yamane et al. | |
| 2010/0076211 A1 | 3/2010 | Yamane et al. | |
| 2011/0098402 A1 | 4/2011 | Yamane et al. | |
| 2013/0216820 A1* | 8/2013 | Riddle | ................... C09D 5/002 |
| | | | 427/407.1 |
| 2014/0113145 A1 | 4/2014 | Yamane et al. | |
| 2014/0147680 A1 | 5/2014 | Yamane et al. | |
| 2014/0302332 A1 | 10/2014 | Murotani et al. | |
| 2015/0307719 A1 | 10/2015 | Mitsuhashi et al. | |
| 2015/0337430 A1 | 11/2015 | Yoshida et al. | |
| 2019/0177574 A1* | 6/2019 | Takeda | ................... C08G 77/54 |
| 2020/0254482 A1 | 8/2020 | Yamane et al. | |
| 2021/0130545 A1 | 5/2021 | Yamane et al. | |

FOREIGN PATENT DOCUMENTS

| | | | | |
|---|---|---|---|---|
| CN | 114630871 B | * 11/2023 | ............... | C09D 1/00 |
| JP | 2007-197425 A | 8/2007 | | |
| JP | 2007-297543 A | 11/2007 | | |
| JP | 2007-297589 A | 11/2007 | | |
| JP | 2008-88412 A | 4/2008 | | |
| JP | 2008-144144 A | 6/2008 | | |
| JP | 2009-519149 A | 5/2009 | | |
| JP | 2010-31184 A | 2/2010 | | |
| JP | 2010-47516 A | 3/2010 | | |
| JP | 2011-116947 A | 6/2011 | | |
| JP | 2011-178835 A | 9/2011 | | |
| JP | 2013-189007 A | 9/2013 | | |
| JP | 2013-253228 A | 12/2013 | | |
| JP | 2014-503380 A | 2/2014 | | |
| JP | 2014-84405 A | 5/2014 | | |

(Continued)

OTHER PUBLICATIONS

International Search Report, issued in PCT/JP2020/038844, dated Dec. 28, 2020.

(Continued)

*Primary Examiner* — Sophie Hon
(74) *Attorney, Agent, or Firm* — Birch, Stewart, Kolasch & Birch, LLP

(57) ABSTRACT

An alkali-resistant water repellent member according to the present invention has: a silica layer on at least one surface of a base material, said silica layer having a film thickness of from 1 nm to 5 μm, while containing 50% by mass or more of silica nanoparticles and 1% by mass or more of an organosilicon compound that has a plurality of silanol groups in each molecule; and a water repellent oil repellent layer on the outer surface of the silica layer, said water repellent oil repellent layer having a film thickness of from 0.5 nm to 30 nm, while being mainly composed of a cured product of a hydrolyzable fluorine-containing organosilicon compound. This alkali-resistant water repellent member is able to easily provide various base materials with a water repellent oil repellent coating film in a stable manner, said coating film having excellent alkali resistance and wet wear resistance.

7 Claims, No Drawings

(56) References Cited

FOREIGN PATENT DOCUMENTS

| | | | |
|---|---|---|---|
| JP | 2014-105235 A | 6/2014 | |
| JP | 2014-218639 A | 11/2014 | |
| JP | 7287488 B2 * | 6/2023 | ........... C09D 171/00 |
| WO | WO 2010/038648 A1 | 4/2010 | |
| WO | WO 2013/121984 A1 | 8/2013 | |
| WO | WO 2014/097388 A1 | 6/2014 | |
| WO | WO-2018034138 A1 * | 2/2018 | ........... C08G 65/336 |
| WO | WO 2019/035271 A1 | 2/2019 | |
| WO | WO 2019/069642 A1 | 4/2019 | |

OTHER PUBLICATIONS

Written Opinion of the International Searching Authority, issued in PCT/JP2020/038844, dated Dec. 28, 2020.

* cited by examiner

ALKALI-RESISTANT WATER REPELLENT MEMBER, METHOD FOR PRODUCING SAID WATER REPELLENT MEMBER, AND METHOD FOR IMPROVING ALKALI RESISTANCE AND WEAR RESISTANCE OF WATER REPELLENT MEMBER

TECHNICAL FIELD

The present invention relates to a water-repellent member having alkali resistance and abrasion resistance, and a method for producing the water-repellent member, and specifically relates to: an alkali-resistant water-repellent member provided, between a substrate and a water/oil-repellent layer, with a silica layer including an organosilicon compound having silica nanoparticles as a principal component and having a plurality of silanol groups in a molecule, and a method for producing the water-repellent member; and a method for improving the alkali resistance and abrasion resistance of the water-repellent member.

BACKGROUND ART

In recent years, in order to improve the appearance and visibility, there has been an increasing demand for a technique that hardly attaches stain and a technique that easily removes stain. Particularly, sebum and oil easily adhere to surfaces of a spectacle lens, a smartphone, a wearable terminal, a car navigation system, a housing of an electronic device, a kitchen table, a water washing metal fitting, and a body of a transportation device, and thus it is desired to provide a water/oil-repellent layer. However, a compound having a fluorine group used as a water/oil-repellent agent has very small surface free energy, and has non-stickiness and non-adhesiveness to various substrates. Therefore, it is difficult to directly adhere the water/oil-repellent agent to the substrate. This leads to easy peeling of the water/oil-repellent layer (low abrasion resistance) by rubbing with, for example, a wet sponge, cloth, and finger. Furthermore, recently, in housing environment applications such as a kitchen and a water washing metal fitting, it is assumed that an alkaline detergent and an aqueous solution with the alkaline detergent dissolved adhere to the surface of the substrate. Therefore, the water/oil-repellent layer is increasingly required not to be deteriorated under alkaline conditions (alkali resistance). The water/oil-repellent agent hardly adheres to the substrate, also leading to a decrease in alkali resistance. As described above, a technique for making a water/oil-repellent agent adhered to a substrate is indispensable in consideration of a wide range of applications.

In order to solve such a problem, for example, JP-A 2011-116947 (Patent Document 1) discloses a fluorooxyalkylene group-containing polymer composition represented by the following average composition formula as a treatment agent capable of subjecting the surface of the substrate such as glass to a water/oil-repellent treatment, $$A-Rf^1-B \qquad [\text{Chem. 1}]$$

wherein $Rf^1$ represents a divalent linear fluorooxyalkylene group including 5 to 100 repeating units of $-C_dF_{2d}O-$ (d is an integer of 1 to 6, and may be different for each repeating unit), and A and B each independently represent a group selected from an $Rf^2$ group or a group represented by the following formula:

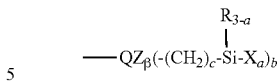

[Chem. 2]

$Rf^2$ is F, H, a monovalent fluorine-containing group whose terminal is a $-CF_3$ group or a $-CF_2H$ group, Q is a divalent organic group, Z is a 2 to 7 valent organopolysiloxane residue having a siloxane bond, R is an alkyl group or a phenyl group having 1 to 4 carbon atoms, X is a hydrolyzable group, a is an integer of 2 or 3, b is 1 to 6, c is 1 to 5, and β is an integer of 0 or 1.

However, the treatment agent proposed in Patent Document 1 exhibits relatively excellent durability on a substrate having many silanol groups represented by glass for example; however, it is difficult to obtain excellent adhesiveness to, for example, metals, metal oxides, and resins.

As a method for improving adhesiveness, a method of providing a $SiO_2$ layer as a primer layer by a dry method (vapor deposition method or sputtering method) is disclosed (WO 2014/097388: Patent Document 2). It has been shown that the use of this method can form a water/oil-repellent layer excellent in abrasion resistance; however, the application range is limited in terms of productivity and production cost, since treatment in vacuum is required and a large-scale apparatus is required for applying a large substrate.

Whereas, there is disclosed a polysilazane solution capable of providing a primer layer by a wet method (WO 2010/038648: Patent Document 3). It is utilized that the polysilazane solution is applied and then reacts with moisture to be converted into silica glass. This method is superior to the dry method in that no vacuum process is used; however, long-time high-temperature heating or humidification is required in order to stabilize the adhesiveness of the water/oil-repellent layer, and therefore there are problems in terms of productivity and cost, and there is a problem of the limitation of the substrate that can be applied.

As conventional techniques related to the present invention, the following documents can be cited together with the above documents.

PRIOR ART DOCUMENTS

Patent Documents

Patent Document 1: JP-A 2011-116947
Patent Document 2: WO 2014/097388
Patent Document 3: WO 2010/038648
Patent Document 4: JP-A 2007-197425
Patent Document 5: JP-A 2007-297589
Patent Document 6: JP-A 2007-297543
Patent Document 7: JP-A 2008-088412
Patent Document 8: JP-A 2008-144144
Patent Document 9: JP-A 2010-031184
Patent Document 10: JP-A 2010-047516
Patent Document 11: JP-A 2011-178835
Patent Document 12: JP-A 2014-084405
Patent Document 13: JP-A 2014-105235
Patent Document 14: JP-A 2013-253228
Patent Document 15: JP-A 2014-218639
Patent Document 16: WO 2013/121984

SUMMARY OF INVENTION

Technical Problem

The present invention has been made in view of the above circumstances, and an object thereof is to provide a water-repellent member having excellent alkali resistance and abrasion resistance, a method for producing a water-repellent member obtained by forming a water/oil-repellent layer having excellent alkali resistance and abrasion resistance on various substrates by a wet method, and a method for improving the alkali resistance and abrasion resistance of the water-repellent member.

Solution to Problem

As a result of intensive studies to achieve the above object, the inventors have found that a water repellent member in which a specific-thickness silica layer containing silica nanoparticles as a principal component and an organosilicon compound having a plurality of silanol groups in the molecule is deposited on the surface of at least one side of any one of various substrates, and a water/oil repellent layer composed mainly of a cured product of a hydrolyzable fluorine-containing organosilicon compound and having a specific thickness is then deposited on the outer surface of the silica layer is obtained by a method comprising the steps of wet coating a dispersion of silica nanoparticles and an organosilicon compound having a plurality of silanol groups in the molecule in a solvent onto at least one side surface of a substrate, drying the dispersion to remove the solvent and to form a silica layer, wet coating a solution of a hydrolyzable fluorine-containing organosilicon compound in a solvent onto an outer surface of the silica layer, and drying the solution to remove the solvent and to cure the hydrolyzable fluorine-containing organosilicon compound, and that the water repellent member can endow various substrates with a water/oil repellent film having improved alkali resistance and wet abrasion resistance in a consistent simple manner. The invention is predicated on this finding.

That is, the present invention provides an alkali-resistant water-repellent member, a method for producing the water-repellent member, and a method for improving alkali resistance and abrasion resistance of the water-repellent member as follows.

[1]
An alkali-resistant water-repellent member, comprising:
a substrate having surfaces;
a silica layer disposed on at least one side of the substrate surfaces, containing at least 50% by weight of silica nanoparticles and at least 1% by weight of an organosilicon compound having a plurality of silanol groups in a molecule, and having a thickness of 1 nm to 5 μm; and
a water/oil repellent layer disposed on an outer surface of the silica layer, composed mainly of a cured product of a hydrolyzable fluorine-containing organosilicon compound, and having a thickness of 0.5 to 30 nm.

[2]
The alkali-resistant water-repellent member according to [1], wherein the silica nanoparticles have an average particle size of up to 30 nm.

[3]
The alkali-resistant water-repellent member according to [1] or [2], wherein the organosilicon compound having a plurality of silanol groups in a molecule is a hydrolysis/partial condensate of tetraalkoxysilane.

[4]
The alkali-resistant water-repellent member according to any one of [1] to [3], wherein the silica layer containing at least 50% by weight of silica nanoparticles and at least 1% by weight of an organosilicon compound having a plurality of silanol groups in a molecule further contains 0.1 to 49% by weight of nanoparticles of at least one type selected from titanium oxide nanoparticles, platinum nanoparticles, and tin oxide nanoparticles having an average particle size of up to 30 nm.

[5]
The alkali-resistant water-repellent member according to any one of [1] to [4], wherein the hydrolyzable fluorine-containing organosilicon compound is a perfluoropolyether group-containing organosilicon compound having at least one hydrolyzable group in a molecule.

[6]
The alkali-resistant water-repellent member according to any one of [1] to [5], wherein the hydrolyzable fluorine-containing organosilicon compound is at least one selected from hydrolyzable fluorine-containing organosilicon compounds represented by following general formulas (1) to (5):

(1)

(2)

(3)

wherein Rf is a divalent linear perfluorooxyalkylene polymer residue independently represented by $-(CF_2)_d-O-(CF_2O)_p(CF_2CF_2O)_q(CF_2CF_2CF_2O)_r(CF_2CF_2CF_2CF_2O)_s(CF(CF_3)CF_2O)_t-(CF_2)_{d'}-$, d is independently an integer of 0 to 8, p, q, r, s, and t are each independently an integer of 0 to 200, and p+q+r+s+t=3 to 500. In addition, the repeating units indicated in parentheses to which p, q, r, s, and t are attached may be randomly combined. A is independently a fluorine atom, a hydrogen atom, or a monovalent fluorine-containing group whose terminal is a $-CF_3$ group, a $-CF_2H$ group, or a $-CH_2F$ group, Z and Z' are independently a single bond, or a 2 to 8 valent organic group that may include a nitrogen atom, an oxygen atom, a silicon atom, a phosphorus atom, or a sulfur atom and may be substituted with fluorine, and W is independently a monovalent organic group having a hydrolyzable silyl group at the terminal. α and β are each independently an integer of 1 to 7 and α+β is an integer of 2 to 8. γ is an integer of 2 to 8.

(4)

(5)

wherein Rf and A are the same as described above, Q is independently a single bond or a divalent organic group, δ is independently an integer of 1 to 10, Y is independently a divalent organic group having a hydrolyzable silyl group, and B is independently a hydrogen atom, an alkyl group having 1 to 4 carbon atoms, or a halogen atom.

[7]
The alkali-resistant water-repellent member according to [6], wherein the hydrolyzable fluorine-containing organosilicon compound having any one of the formulas (1) to (5) is one or two or more selected from following compounds.

[Chem. 3]

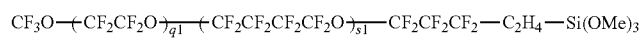

-continued
[Chem. 4]
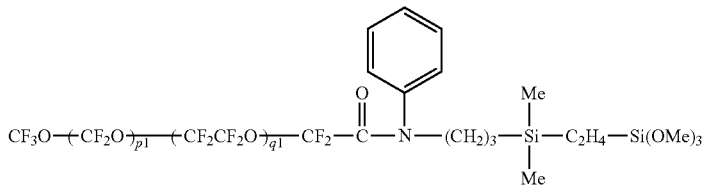
[Chem. 5]
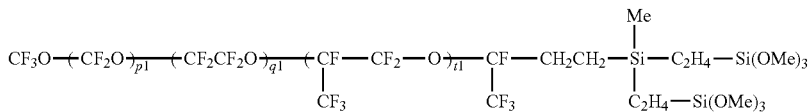
[Chem. 6]
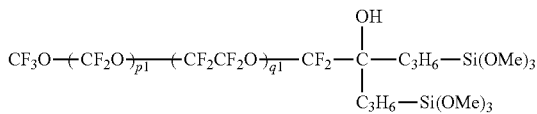
[Chem. 7]
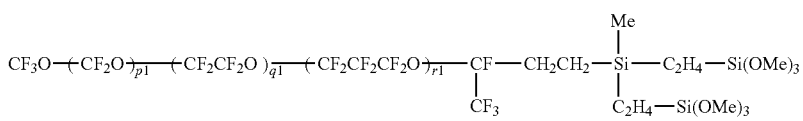
[Chem. 8]
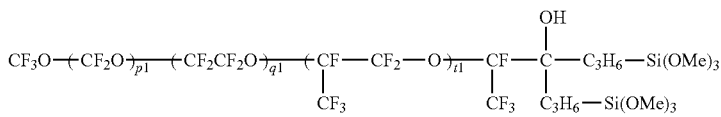
[Chem. 9]
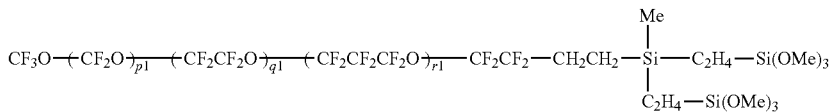
[Chem. 10]
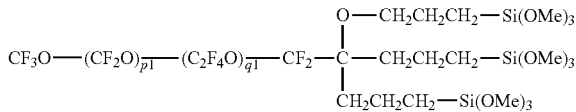
[Chem. 11]
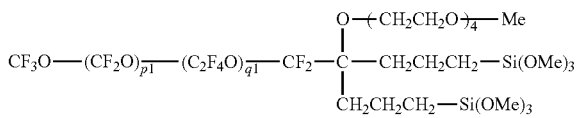
[Chem. 12]
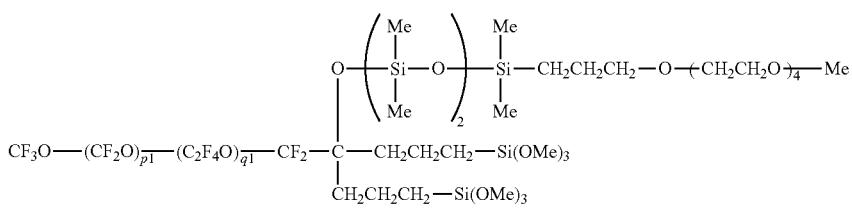
[Chem. 13]
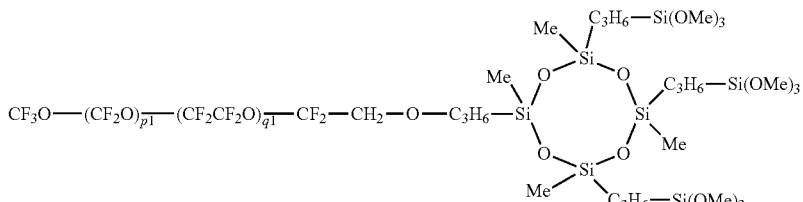
[Chem. 14]
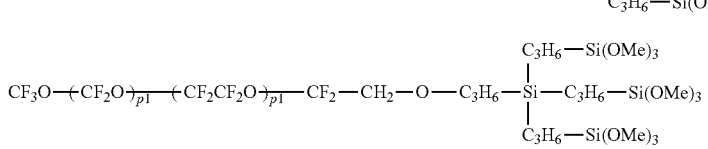

-continued
[Chem. 15]
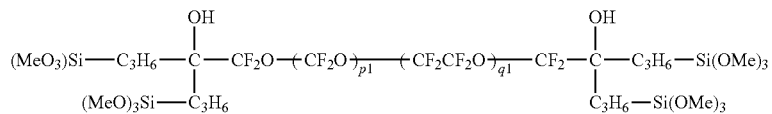
[Chem. 16]
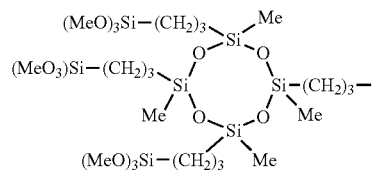
[Chem. 17]
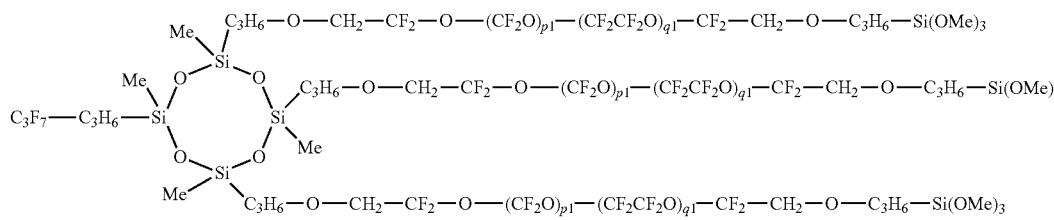
[Chem. 18]
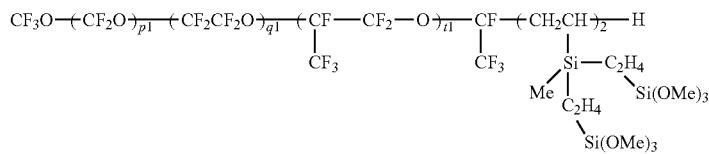
[Chem. 19]
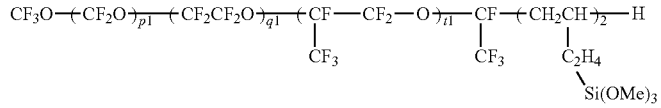
[Chem. 20]
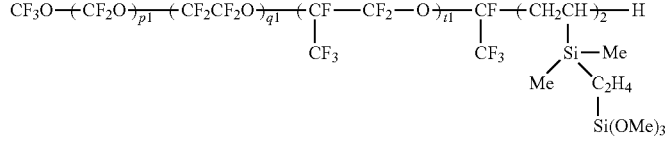
[Chem. 21]
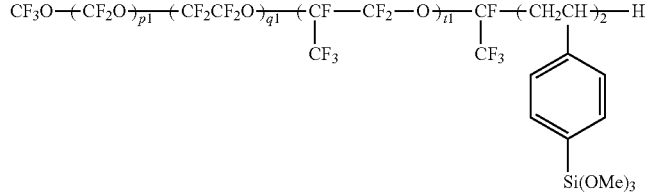
[Chem. 22]
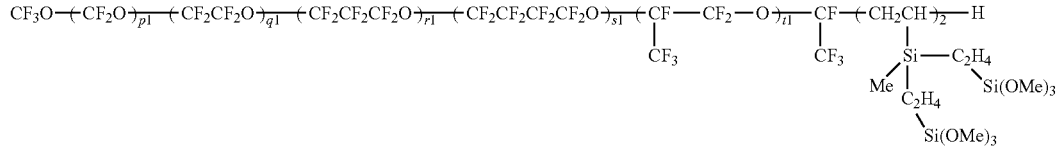
[Chem. 23]
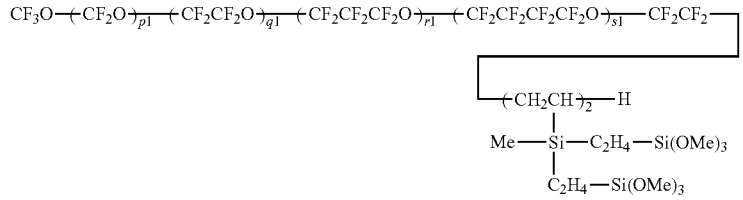

-continued

[Chem. 24]

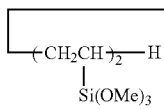
[Chem. 25]

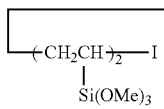
[Chem. 26]

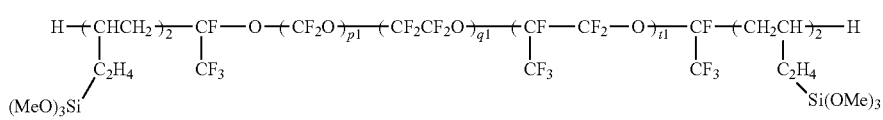
[Chem. 27]

wherein, Me is a methyl group, p1, q1, r1, s1, and t1 are each independently an integer of 1 to 200, the sum of p1, q1, r1, s1, and t1 is 3 to 500, and each repeating unit shown in parentheses to which p1, q1, r1, s1, and t1 are attached may be randomly combined.

[8]
The alkali-resistant water-repellent member according to any one of [1] to [7], wherein a substrate is of metal oxide, metal, resin, ceramic, quartz, glass, sapphire, or diamond.

[9]
A method for producing an alkali-resistant water-repellent member according to any one of [1] to [8], the method comprising the steps of:
   wet coating a dispersion of silica nanoparticles and an organosilicon compound having a plurality of silanol groups in a molecule in a solvent onto at least one side surface of a substrate having surfaces;
   drying the dispersion to remove the solvent and to form a silica layer;
   wet coating a solution of a hydrolyzable fluorine-containing organosilicon compound in a solvent onto an outer surface of the silica layer; and
   drying the solution to remove the solvent and to cure the hydrolyzable fluorine-containing organosilicon compound.

[10]
A method for improving alkali resistance and abrasion resistance of a water-repellent member, characterized by providing a silica layer containing at least 50% by weight of silica nanoparticles and at least 1% by weight of an organosilicon compound having a plurality of silanol groups in a molecule, and having a thickness of 1 nm to 5 µm between a substrate and a water/oil repellent layer composed mainly of a cured product of a hydrolyzable fluorine-containing organosilicon compound and having a thickness of 0.5 to 30 nm.

In the present invention, "linear perfluorooxyalkylene polymer residue" means that the divalent fluorooxyalkylene repeating units constituting the perfluorooxyalkylene structure of the main chain are linearly linked, and each divalent fluorooxyalkylene unit itself may be, for example, a fluorooxyalkylene unit having a branched structure such as —[CF(CF$_3$)CF$_2$O]—.

Advantageous Effects of Invention

According to the invention, there is provided a water repellent member (water-repellent and oil-repellent member) excellent in alkali resistance, having an antifouling layer with improved water/oil repellent properties tightly adhered to its surface. The method for producing the water-repellent member enables to form the relevant layer by the wet process (e.g., brush application, spray, dipping, spin, ink jet) without resorting essentially to the vacuum process or high-temperature heating process. The water repellent member and the method are useful in a variety of applications, for example, an article having an anti-fouling property on the surface, particularly, a housing of an electronic device, a wearable terminal, a bathtub, a water washing metal fitting, a kitchen appliance and a sanitary appliance, a body of a transportation device, and the like.

DESCRIPTION OF EMBODIMENTS

Hereinafter, the present invention is described in more detail.

The present invention provides an alkali-resistant water repellent member comprising any of various substrates, a silica layer disposed on at least one side of the substrate surfaces, containing at least 50% by weight of silica nanoparticles and 1% by weight or more of an organosilicon compound having a plurality of silanol groups in a molecule, and having a thickness of 1 nm to 5 µm, and a water/oil repellent layer disposed on an outer surface of the silica layer, composed mainly of a cured product of a hydrolyzable fluorine-containing organosilicon compound, and having a thickness of 0.5 to 30 nm, which is prepared, for example, by a method comprising the steps of wet coating a dispersion of silica nanoparticles and an organosilicon compound having a plurality of silanol groups in a molecule in a solvent (nano-silica dispersion) onto at least one side surface of any of various substrates, drying the dispersion to remove the solvent and to form a silica layer on the substrate surface, wet coating a solution of a hydrolyzable fluorine-containing organosilicon compound in a solvent (antifouling coating agent) onto an outer surface of the silica layer, and drying the solution to remove the solvent and to cure the fluorinated organosilicon compound, thereby forming a water/oil repellent layer on the outer surface of the silica layer.

The substrate to be applied in the present invention is not particularly limited, and metal oxides, metals, resins, ceramics, quartz, glass, sapphire, and diamond are particularly preferable.

Herein, examples of the metal oxide include SiO, $SiO_2$, $Al_2O_3$, ITO, $In_2O_3$, $SnO_2$, $ZrO_2$, $TiO_2$, $Ti_2O_3$, $Ti_4O_7$, $Ti_3O_5$, $Nb_2O_5$, $Ta_2O_5$, $Y_2O_3$, $WO_3$, $HfO_2$, and $La_2Ti_2O_7$.

In addition, examples of the metal include magnesium, a magnesium alloy, titanium, a titanium alloy, chromium, iron, nickel, cobalt, copper, zinc, yttrium, zirconium, niobium, molybdenum, ruthenium, rhodium, palladium, silver, tungsten, platinum, gold, stainless steel, aluminum, an aluminum alloy, duralumin, and hastelloy.

Furthermore, examples of the resin include thermoplastic resins and thermosetting resins, and specifically, the following resins are preferable. Examples thereof include: thermoplastic resins such as celluloid, cellulose acetate, cellulose propionate, cellulose butyrate, aliphatic polyamides such as 6-nylon, 6,6-nylon, and 12 nylon, aromatic polyamide, (meth)acrylic resin, ABS resin, AS resin, polystyrene, polyolefins such as polyethylene (low density or high density), polypropylene, polyvinyl chloride, polyvinylidene chloride, ethylene-vinyl acetate copolymer, polyvinyl alcohol, polyacetal, polycarbonate, saturated polyesters such as polyethylene terephthalate and polybutylene terephthalate, aromatic polyester, polyether ketone, polyether ether ketone, polysulfone, polyether sulfone, polyetherimide, polyarylate, polymethylpentene, ionomer, liquid crystal polymer, polyimide, polyamideimide, fluororesin, polyphenylene sulfide, (modified) polyphenylene oxide, thermoplastic polyurethane; or thermosetting resins such as epoxy resin, unsaturated polyester, thermosetting polyurethane, polyimide, a polymer of diethylene glycol bisallyl carbonate (commonly called CR-39), a (co)polymer of di(meth)acrylate of (halogenated) bisphenol A, a (co)polymer of urethane-modified di(meth)acrylate of (halogenated) bisphenol A, a copolymer of a diacrylate compound or vinylbenzyl alcohol and an unsaturated thiol compound.

Examples of the ceramic include alumina, zirconia, silicon nitride, silicon carbide, aluminum nitride, boron nitride, forsterite, steatite, cordierite, sialon, machinable ceramics, barium titanate, lead zirconate titanate, ferrite, mullite, and zircon, and examples of the glass include soda glass, crown glass, lead glass, borosilicate glass, crystallized glass, quartz glass, aluminosilicate glass, Tempax, Pyrex, and Neocelam, and are not limited thereto. The glass may be subjected to chemical strengthening treatment or physical strengthening treatment.

The silica layer formed on at least one side of the substrate surfaces has a film thickness of 1 nm to 5 µm and contains 50% by weight or more of silica nanoparticles and 1% by weight or more of an organosilicon compound having a plurality of silanol groups (hydroxyl groups bonded to silicon atoms) in the molecule. The silica layer can be formed by wet-coating a dispersion solution (nano-silica dispersion) including silica nanoparticles, an organosilicon compound having a plurality of silanol groups in a molecule, and a solvent onto the surface of any of various substrates, and then drying the solution and removing the solvent therefrom. The shape of the surface of the substrate to be coated is not limited to a flat surface, and may be a substrate having a three-dimensional shape, or the surface may have irregularities.

The mean particle size (diameter) of the silica nanoparticles is preferably 30 nm or less, more preferably 20 nm or less, still more preferably 10 nm or less, and particularly preferably 5 nm or less. If the mean particle size of the silica nanoparticles is too large, the contact point between the surface of the substrate and the silica nanoparticles decreases, and the adhesiveness to the substrate may deteriorate. The lower limit of the mean particle size may be typically about 0.1 nm or more, and preferably about 0.5 nm or more. In the present invention, the mean particle size can be obtained as, for example, a cumulative volume mean size D50 (or a median diameter) in particle size distribution measurement by a laser beam diffraction method (the same applies hereinafter).

The content of the silica nanoparticles is 50 to 99% by weight, preferably 60 to 99% by weight in the silica layer between the substrate and the fluorine-containing layer (water/oil-repellent layer). If the content is less than 50% by weight, contact between silica nanoparticles is reduced, so that durability is deteriorated.

The organosilicon compound having a plurality of silanol groups (hydroxyl group bonded to a silicon atom) in the molecule preferably has two or more, more preferably three or more, and still more preferably four or more silanol groups in one molecule. If the amount of silanol groups in the molecule is too small, the coating film itself may be weakened. The amount of silanol groups in the organosilicon compound having a plurality of silanol groups in the molecule is preferably 0.0001 to 0.05 mol/g, particularly 0.001 to 0.04 mol/g, and more particularly 0.005 to 0.03 mol/g.

The organosilicon compound having a plurality of silanol groups in the molecule can be obtained, for example, by hydrolyzing and partially condensing an organosilicon compound such as a (organo) silane compound having a plurality of hydrolyzable groups such as alkoxy groups in the molecule.

Examples of a (organo) silane compound having a plurality of hydrolyzable groups in the molecule before hydrolysis/partial condensation, which is a precursor of an organosilicon compound having a plurality of silanol groups in the molecule, include (organo) alkoxysilane compounds having 2 to 4, preferably 3 or 4 alkoxy groups in the molecule, such as methyltrimethoxysilane, dimethyldimethoxysilane, phenyltrimethoxysilane, dimethoxydiphenylsilane, tetramethoxysilane, tetraethoxysilane, methyltriethoxysilane, dimethyldiethoxysilane, phenyltriethoxysilane, n-propyltrimethoxysilane, n-propyltriethoxysilane, hexyltrimethoxysilane, hexiltriethoxysilane, decyltrimethoxysilane, trifluoropropyltrimethoxysilane, vinyltrimethoxysilane, vinyltriethoxysilane, 2-(3,4-epoxycyclohexyl) ethyltrimethoxysilane, 3-glycidoxypropylmethyldimethoxy silane, 3-glycidoxypropyltrimethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane, 1,6-bis(trimethoxysilyl)hexane, tris-(trimethoxysilylpropyl)isocyanate, and chlorosilane compounds such as trichlorosilane, dichlorosilane, methyltrichlorosilane, and dimethyldichlorosilane, and these may be used in combination. Of these, tetraalkoxysilane compounds such as tetramethoxysilane and tetraethoxysilane are preferable.

In the present invention, it is preferable to use, as the organosilicon compound having a plurality of silanol groups in the molecule, an organosilicon compound obtained by hydrolyzing the organosilicon compound having a plurality of hydrolyzable groups in the molecule described above, and then partially dehydrating and condensing the compound (that is, a part of the silanol groups generated from hydrolysis) to increase the molecular weight.

The mass average molecular weight of the above hydrolysis/partial condensate is preferably 300 to 100,000, and more preferably 5000 to 50,000. If the mass average molecular weight is too small, the water/oil-repellent layer (fluorine-containing layer) formed on the silica layer may not exhibit excellent abrasion durability, and if too large, adhesiveness between the substrate or the water/oil-repellent layer (fluorine-containing layer) and the silica layer is deteriorated, and as a result, performance such as abrasion resistance and alkali resistance as a water-repellent member may not be exhibited. In the present invention, the mass average molecular weight can be determined, for example, as a value in terms of polystyrene in gel permeation chromatography (GPC) analysis using toluene as a developing solvent (the same applies hereinafter).

The organosilicon compound having a plurality of silanol groups in the molecule used in the present invention particularly preferably includes a hydrolysis/partial condensate of a tetraalkoxysilane compound such as tetraethoxysilane.

The content of the organosilicon compound having a plurality of silanol groups in the molecule is 1 to 50% by weight, preferably 1 to 40% by weight in the silica layer between the substrate and the fluorine-containing layer (water/oil-repellent layer). If the content is less than 1% by weight, excellent adhesion to the substrate cannot be obtained, and the water/oil-repellent layer (fluorine-containing layer) formed on the silica layer has insufficient performance such as abrasion durability and alkali resistance.

If the content of silica nanoparticles in the silica layer approaches 100% by weight, voids are easily formed in the silica layer, and therefore the density of the silica layer may be increased by further adding and mixing other nanoparticles.

Herein, examples of the particles to be further added and mixed as an optional component to the mixture of silica nanoparticles and an organosilicon compound having a plurality of silanol groups in the molecule include nanoparticles such as titanium oxide, tin oxide, silver, platinum, copper, alumina, calcium oxide, magnesium oxide, manganese oxide, nickel oxide, and zirconium oxide, and nanoparticles of multicomponent oxides, having an average particle size of preferably 30 nm or less, more preferably 20 nm or less, and still more preferably 1 to 10 nm. Of these, titanium oxide nanoparticles, platinum nanoparticles, and tin oxide nanoparticles are preferable. These may be used singly or in combination of two or more. If these particles are used, it is preferable to include 0.1 to 49% by weight, particularly 1 to 25% by weight, of the particles constituting the silica layer (the total of silica nanoparticles and other nanoparticles).

In addition, there may be used surfactants such as an ultraviolet absorber, a light stabilizer, an antioxidant, a leveling agent, an antifoaming agent, a pigment, a dye, a dispersant, an antistatic agent, and an antifogging agent as necessary, as the nano-silica dispersion.

The solvent for dispersing the mixture of the silica nanoparticles and the organosilicon compound having a plurality of silanol groups in the molecule is preferably pure water or alcohols such as methanol and ethanol, is not particularly limited, and may be appropriately selected from the viewpoint of the wettability with the substrate and the boiling point. The concentration of the silica nanoparticles in the dispersion solution including the silica nanoparticles, the organosilicon compound having a plurality of silanol groups in the molecule, and the solvent (and optionally other nanoparticles) is preferably 0.01 to 10% by weight, and more preferably 0.1 to 1% by weight. If the concentration is too low, the area of uncoated parts increases, and if the concentration is too high, secondary aggregation of silica nanoparticles may occur. In addition, the concentration of the organosilicon compound having a plurality of silanol groups in the molecule in the same dispersion solution is preferably 0.001 to 1% by weight, and more preferably 0.01 to 0.1% by weight. If the concentration is too low, adhesiveness with the substrate is deteriorated, and abrasion durability is insufficient, and if the concentration is too high, alkali resistance may be insufficient.

The dispersion solution (nano-silica dispersion) including the silica nanoparticles, an organosilicon compound having a plurality of silanol groups in the molecule, and a solvent is coated onto the surface of the substrate by wet applying, particularly by a method such as an immersion method, a brush coating method, a spin coating method, spray coating, or flow coating, and the solvent is removed by drying to form a silica layer. If it is desired to increase the density of the silica layer, heating may be performed at 50 to 500° C. for 10 minutes to 24 hours in a temperature range that does not affect the substrate.

The film thickness of the silica layer formed on the surface of the substrate is appropriately selected depending on the type of the substrate, and is typically 1 nm to 5 μm, preferably 2 nm to 0.5 μm, and particularly 2 nm to 30 nm. In the present invention, the film thickness can be measured by an X-ray reflectance method (the same applies hereinafter).

Then, an antifouling coating agent is coated onto the surface of the formed silica layer and cured to form a water/oil-repellent layer (antifouling surface layer). The antifouling coating agent includes a hydrolyzable fluorine-containing organosilicon compound as a principal component. As the hydrolyzable fluorine-containing organosilicon compound, there can be used hydrolyzable fluorine-containing organosilicon compounds described in JP-A 2007-197425, JP-A 2007-297589, JP-A 2007-297543, JP-A 2008-088412, JP-A 2008-144144, JP-A 2010-031184, JP-A 2010-047516, JP-A 2011-116947, JP-A 2011-178835, JP-A 2014-084405, JP-A 2014-105235, JP-A 2013-253228, JP-A 2014-218639, and WO 2013/121984 (Patent Documents 1 and 4 to 16).

The hydrolyzable fluorine-containing organosilicon compound is described more specifically.

The hydrolyzable fluorine-containing organosilicon compound (or hydrolyzable organosilicon compound containing fluorine) according to the present invention is preferably a fluorine-containing organosilicon compound having at least one hydrolyzable group in the molecule, and the compound is more preferably an organosilicon compound that has a hydrolyzable group-containing silyl group such as an alkoxysilyl group and an alkoxyalkoxysilyl group having 1 to 12 carbon atoms in one molecule and that has a fluorine atom. The hydrolyzable fluorine-containing organosilicon compound is preferably a compound having a monovalent or divalent fluorooxyalkylene group-containing polymer residue (perfluoropolyether group). The monovalent or divalent fluorooxyalkylene group-containing polymer residue is a group having a (poly)fluorooxyalkylene structure (perfluoropolyether structure) in which a plurality of one or two or more repeating units represented by —$C_jF_{2j}O$— are bonded (in the structure, j is an integer of 1 or more, preferably 1 to 6, and more preferably 1 to 4). Particularly, the number of repeating units is 3 to 500, preferably 15 to 200, more preferably 20 to 100, and still more preferably 25 to 80.

The repeating unit —$C_jF_{2j}O$— may be any of a linear type or a branched type. Examples thereof include the following units, and two or more of these repeating units may be bonded.

—$CF_2O$—
—$CF_2CF_2O$—
—$CF_2CF_2CF_2O$—
—$CF(CF_3)CF_2O$—
—$CF_2CF_2CF_2CF_2O$—
—$CF_2CF_2CF_2CF_2CF_2O$—
—$C(CF_3)_2O$—

The (poly)fluorooxyalkylene structure is particularly a divalent linear perfluorooxyalkylene polymer residue represented by —$(CF_2)_d$—O—$(CF_2O)_p(CF_2CF_2O)_q(CF_2CF_2CF_2O)_r(CF_2CF_2CF_2CF_2O)_s(CF(CF_3)CF_2O)_t$—$(CF_2)_d$—, wherein d is independently an integer of 0 to 8, preferably an integer of 0 to 5, more preferably an integer of 0 to 2, p, q, r, s, and t are each independently an integer of 0 to 200, preferably, p is an integer of 5 to 100, q is an integer of 5 to 100, r is an integer of 0 to 100, s is an integer of 0 to 50, t is an integer of 0 to 100, and p+q+r+s+t is an integer of 3 to 500, preferably an integer of 10 to 100. The repeating units indicated in parentheses to which p, q, r, s, and t are attached may be randomly combined. Particularly, it can be represented by the following structure:

Wherein Rf is a divalent linear perfluorooxyalkylene polymer residue independently represented by —$(CF_2)_d$—O—$(CF_2O)_p(CF_2CF_2O)_q(CF_2CF_2CF_2O)_r(CF_2CF_2CF_2CF_2O)_s(CF(CF_3)CF_2O)_t$—$(CF_2)_d$—, d is independently an integer of 0 to 8, p, q, r, s, and t are each independently an integer of 0 to 200, and p+q+r+s+t=3 to 500. In addition, the repeating units indicated in parentheses to which p, q, r, s, and t are attached may be randomly combined. A is independently a fluorine atom, a hydrogen atom, or a monovalent fluorine-containing group whose terminal is a —$CF_3$ group, a —$CF_2H$ group, or a —$CH_2F$ group, Z and Z' are independently a single bond, or a 2 to 8 valent organic group that may include a nitrogen atom, an oxygen atom, a silicon atom, a phosphorus atom, or a sulfur atom and may be substituted with fluorine, and W is independently a monovalent organic group having a hydrolyzable silyl group at the terminal. α and β are each independently an integer of 1 to 7, preferably, α is an integer of 1 to 3, more preferably 1, β is an integer of 1 to 3, and α+β is an integer of 2 to 8, preferably an integer of 2 to 4. γ is an integer of 2 to 8, preferably 2 or 3.

In addition, Q is independently a single bond or a divalent organic group, δ is independently an integer of 1 to 10, Y is independently a divalent organic group having a hydrolyzable silyl group, and B is independently a hydrogen atom, an alkyl group having 1 to 4 carbon atoms, or a halogen atom.

In the above formulas (1) to (5), Rf is independently —$(CF_2)_d$—O—$(CF_2O)_p(CF_2CF_2O)_q(CF_2CF_2CF_2O)_r(CF_2CF_2CF_2CF_2O)_s(CF(CF_3)CF_2O)_t$—$(CF_2)_d$—, which is

[Chem. 28]

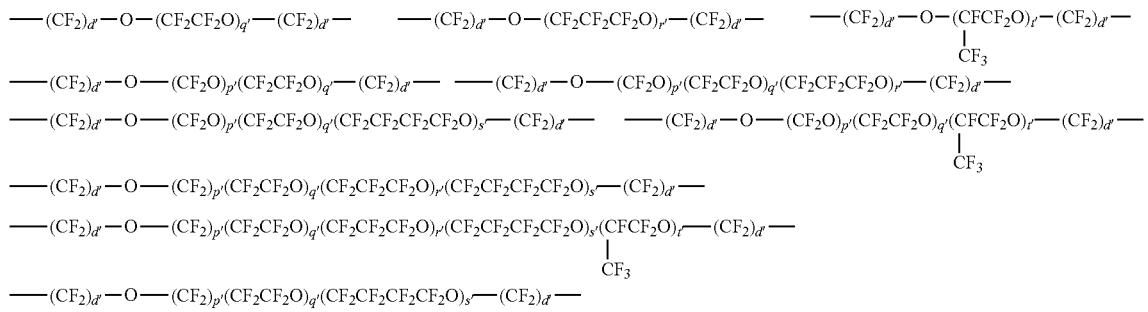

wherein d' is independently an integer of 0 to 5, p', q', r', s', and t' are each independently an integer of 1 to 200, and a sum of p', q', r', s', and t' is 3 to 500. The repeating units indicated in parentheses to which p', q', r', s', and t' are attached may be randomly combined.

The hydrolyzable fluorine-containing organosilicon compound according to the present invention is more preferably a hydrolyzable fluorine-containing organosilicon compound (or a hydrolyzable fluorinated organosilicon compound) represented by any of the following general formulas (1) to (5). These may be used singly or in combination of two or more.

$(A-Rf)_\alpha—ZW_\beta$     (1)

$Rf—(ZW_\beta)_2$     (2)

$Z'—(Rf—ZW_\beta)_\gamma$     (3)

$A-Rf-Q-(Y)_\delta—B$     (4)

$Rf-(Q-(Y)_\delta—B)_2$     (5)

the (poly)fluorooxyalkylene structure described above, and the same as described above can be exemplified.

In the above formulas (1) and (4), A is independently a fluorine atom, a hydrogen atom, or a monovalent fluorine-containing group whose terminal is a —$CF_3$ group, a —$CF_2H$ group, or a —$CH_2F$ group. Specific examples of the monovalent fluorine-containing group whose terminal is a —$CF_3$ group, a —$CF_2H$ group, or a —$CH_2F$ group can include a —$CF_3$ group, a —$CF_2CF_3$ group, a —$CF_2CF_2CF_3$ group, and a —$CH_2CF(CF_3)$—$OC_3F_7$ group. Of As, particularly, a —$CF_3$ group, a —$CF_2CF_3$ group, and a —$CF_2CF_2CF_3$ group are preferable.

In the above formulas (1) to (3), Z and Z' are independently a single bond or a 2 to 8 valent organic group that may include a nitrogen atom, an oxygen atom, a silicon atom, a phosphorus atom, or a sulfur atom and may be substituted with fluorine. The organic group can be represented by $(L)_eM$ (e is an integer of 1 to 7, preferably an integer of 1 to 3).

Herein, L is a single bond, or an oxygen atom, a sulfur atom, or a divalent organic group, and in the above formulas (1) to (3), L of Z is a linking group of an Rf group and a M group (or a W group), and L of Z' is a linking group of a M group (or an Rf group) and an Rf group. The divalent organic group is preferably an unsubstituted or substituted divalent organic group having 2 to 12 carbon atoms, optionally including one or two or more selected from the group consisting of an amide bond, an ether bond, an ester bond, or a diorganosilylene group such as a dimethylsilylene group, and a group represented by —Si[OH][(CH$_2$)$_f$Si(CH$_3$)$_3$]— (f is an integer of 2 to 4), and more preferably an unsubstituted or substituted divalent hydrocarbon group having 2 to 12 carbon atoms, optionally including the above structure.

Examples of the unsubstituted or substituted divalent hydrocarbon group having 2 to 12 carbon atoms include an alkylene group such as an ethylene group, a propylene group (trimethylene group, methylethylene group), a butylene group (tetramethylene group, methylpropylene group), a hexamethylene group, or an octamethylene group, an arylene group such as a phenylene group, or a combination of two or more of these groups (such as an alkylene arylene group). Furthermore, a part or all of hydrogen atoms bonded to carbon atoms of these groups may be substituted with halogen atoms such as fluorine and iodine. Of these, an unsubstituted or substituted alkylene group or phenylene group having 2 to 4 carbon atoms is preferable.

Examples of the divalent organic group of L include a group represented by the following structure or a group in which two or more thereof are bonded:

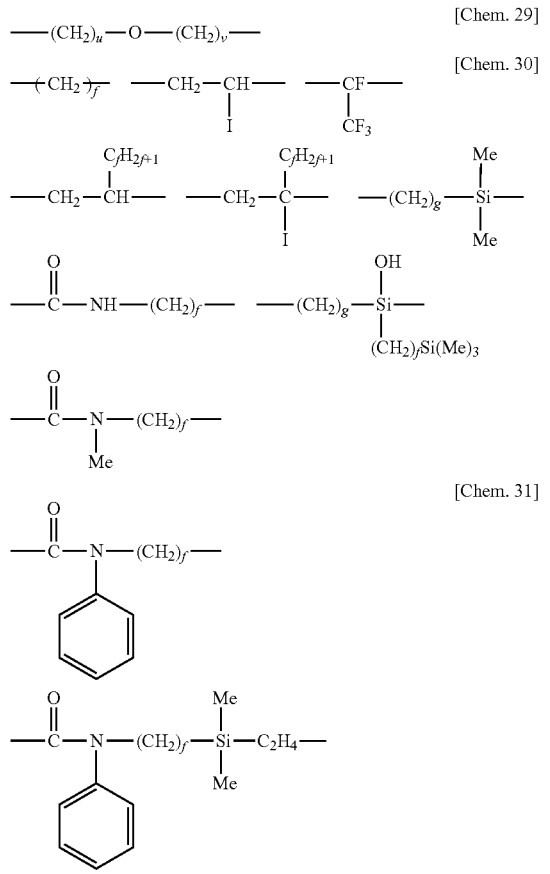

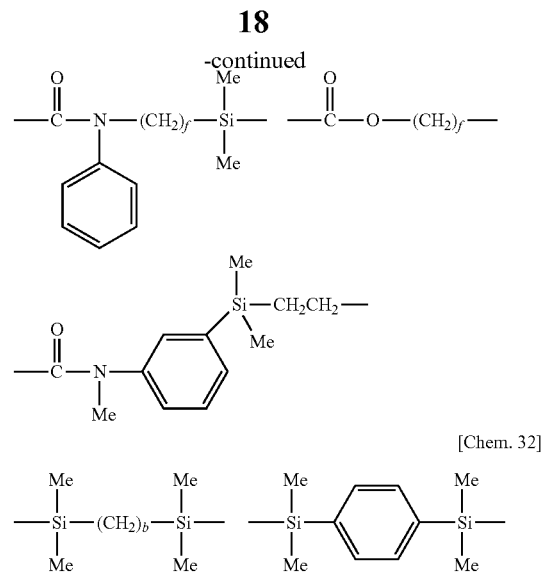

wherein f is an integer of 2 to 4, b is an integer of 2 to 6, preferably an integer of 2 to 4, u and v are integers of 1 to 4, g is an integer of 2 to 4, and Me is a methyl group.

In addition, M represents a single bond, or a nitrogen atom, a silicon atom, a carbon atom, a phosphorus atom, or a group including these atoms, or a 2 to 8 valent ((e+1) valent) organic group. Specifically, there is a group selected from a single bond, a divalent group represented by —R$^1_2$C—, a divalent group represented by —R$^3_2$Si—, a divalent group represented by —NR$^4$—, a trivalent group represented by —N=, a trivalent group represented by —P=, a trivalent group represented by —PO=, a trivalent group represented by —R$^1$C=, a trivalent group represented by —R$^3$Si=, a trivalent group represented by —N=, a tetravalent group represented by —C≡, a tetravalent group represented by —O—C≡, and a tetravalent group represented by —Si≡, or a 2 to 8 valent siloxane residue, and in the above formulas (1) to (3), all Ms of Z are a linking group between an L group (or an Rf group) and a W group, and M of Z' is a group linking the Rf group via the L group (or Rf groups each other).

In the above description, R$^1$ is each independently preferably a group having a repeating unit of an alkyl group having 1 to 3 carbon atoms, a hydroxyl group, or an oxyalkylene group having 1 to 3 carbon atoms optionally having a diorganosiloxane structure having 2 to 51 silicon atoms interposed therebetween, or a silyl ether group represented by R$^2_3$SiO—, and R$^2$ is each independently a hydrogen atom, preferably an alkyl group having 1 to 3 carbon atoms, an aryl group such as a phenyl group, or an alkoxy group having 1 to 3 carbon atoms. R$^3$ is each independently preferably an alkyl group having 1 to 3 carbon atoms, an alkenyl group having 2 or 3 carbon atoms, an alkoxy group having 1 to 3 carbon atoms, or a chloro group. R$^4$ is an alkyl group having 1 to 3 carbon atoms and an aryl group having 6 to 10 carbon atoms such as a phenyl group. If M is a siloxane residue, it is preferable to have a linear, branched, or cyclic organopolysiloxane structure having 2 to 51 silicon atoms, preferably 2 to 13 silicon atoms, more preferably 2 to 11 silicon atoms, and still more preferably 2 to 5 silicon atoms. The organopolysiloxane preferably may have 1 to 8 carbon atoms, preferably a methyl group, an ethyl group, a propyl group, and a butyl group having 1 to 4 carbon atoms, and an unsubstituted or fluorine-substituted alkyl group such as C$_3$F$_7$—C$_3$H$_6$—, or a phenyl group. In addition, it may contain a silalkylene structure in which two silicon atoms are bonded by an alkylene group, that is, Si—(CH$_2$)$_n$—Si. In the above formula, n is an integer of 2 to 6, preferably an integer of 2 to 4.

Examples of such M include those shown below.

[Chem. 33]
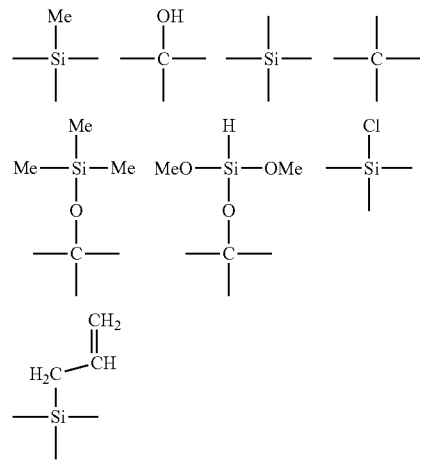

[Chem. 34]
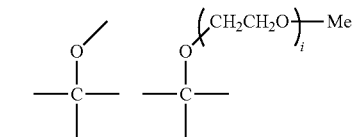

[Chem. 35]
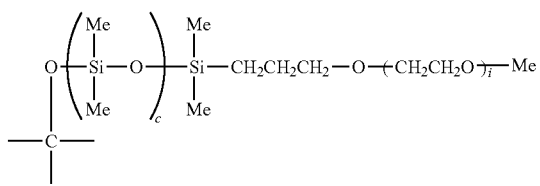

[Chem. 36]
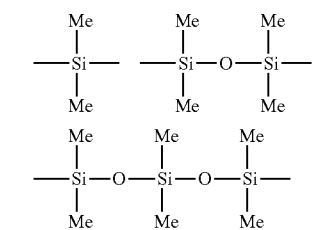

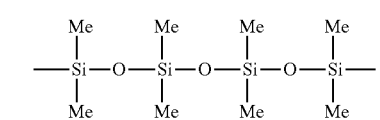

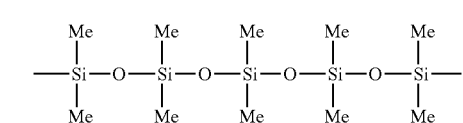

[Chem. 37]
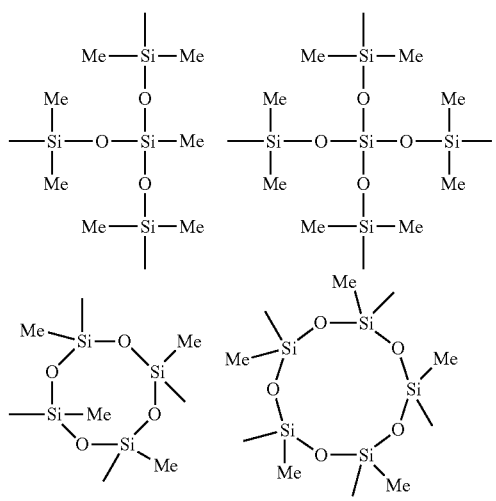

[Chem. 38]
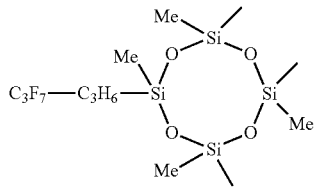

[Chem. 39]
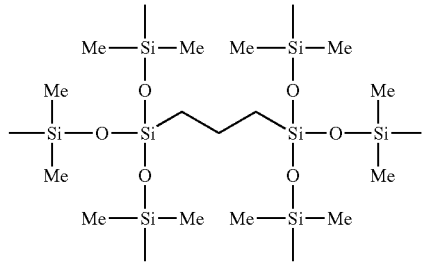

wherein i is an integer of 1 to 20, c is an integer of 1 to 50, and Me is a methyl group.

In the above formulas (1) to (3), W is independently a monovalent organic group having a hydrolyzable silyl group at the terminal, and is preferably a hydrolyzable silyl group represented by the following formula:

[Chem. 40]
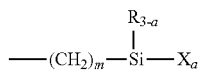

wherein R is an alkyl group having 1 to 4 carbon atoms or a phenyl group, X is independently a hydrolyzable group, a is 2 or 3, and m is an integer of 0 to 10.

Examples of the hydrolyzable group of X in the above formula include: alkoxy groups having 1 to 12 carbon atoms, particularly 1 to 10 carbon atoms, such as a methoxy group, an ethoxy group, a propoxy group, and a butoxy group; an alkoxyalkoxy group having 2 to 12 carbon atoms, particularly 2 to 10 carbon atoms, such as a methoxymethoxy group and a methoxyethoxy group; an acyoxy group having 1 to 10 carbon atoms, such as an acetoxy group; an alkenyloxy group having 2 to 10 carbon atoms, such as an isopropenoxy group; halogen groups such as a chlor group, a bromo group, and an iodo group; and an amino group. Of these, a methoxy group and an ethoxy group are preferable.

In addition, R is an alkyl group having 1 to 4 carbon atoms such as a methyl group and an ethyl group, or a phenyl group, and a methyl group is particularly preferable.

a is 2 or 3, and is preferably 3 from the viewpoint of reactivity and adhesiveness to a substrate. m is an integer of 0 to 10, preferably an integer of 2 to 8, and more preferably 2 or 3.

In the formulas (1) to (3), examples of the structures represented by $(-)_\alpha Z W_\beta$ and $-Z W_\beta$ include the following structures:

[Chem. 41]

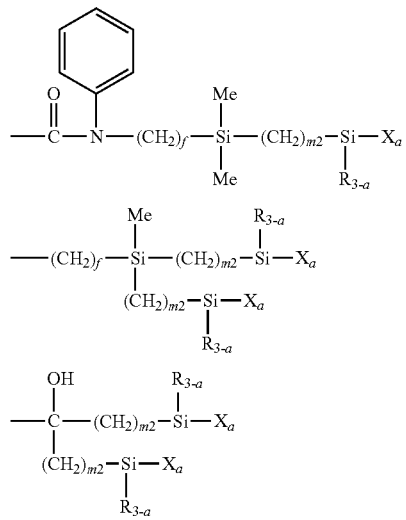

[Chem. 42]

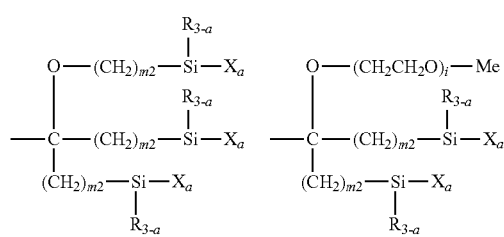

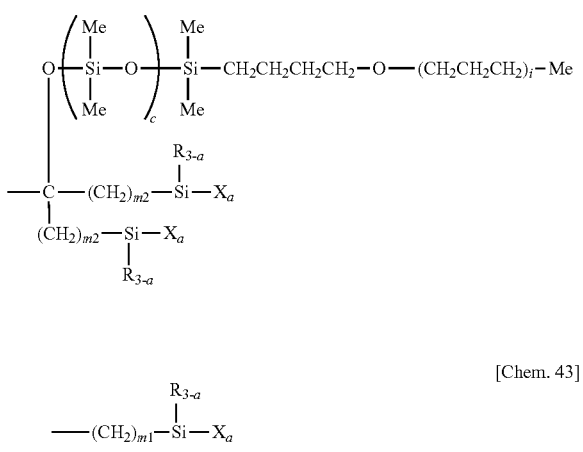

[Chem. 43]

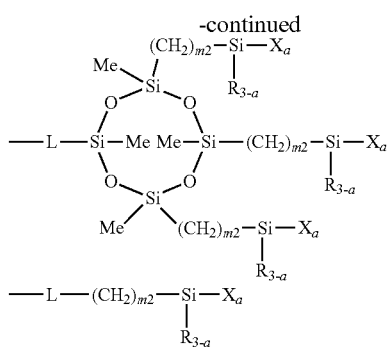

[Chem. 44]

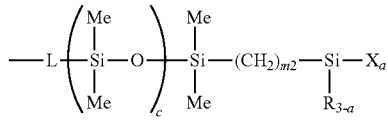

[Chem. 45]

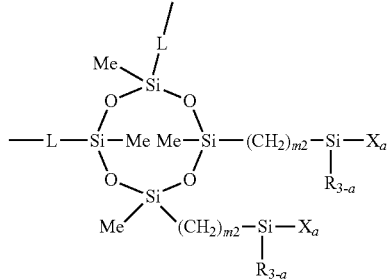

wherein L, R, X, f, i, c, and a are as described above, m1 is an integer of 0 to 10, preferably an integer of 2 to 8, m2 is an integer of 1 to 10, preferably an integer of 2 to 8, and Me is a methyl group.

In the above formulas (4) and (5), Q is independently a single bond or a divalent organic group, and is a linking group between an Rf group and a Y group. The divalent organic group of the Q is preferably an unsubstituted or substituted divalent organic group having 2 to 12 carbon atoms, optionally including one or two or more selected from the group consisting of an amide bond, an ether bond, an ester bond, or a diorganosilylene group such as a dimethylsilylene group, and a group represented by $-Si[OH][(CH_2)_f Si(CH_3)_3]-$ (f is an integer of 2 to 4), and more preferably an unsubstituted or substituted divalent hydrocarbon group having 2 to 12 carbon atoms, optionally including the above structure.

Examples of the unsubstituted or substituted divalent hydrocarbon group having 2 to 12 carbon atoms can include the same groups as the unsubstituted or substituted divalent hydrocarbon group having 2 to 12 carbon atoms exemplified in the above L.

Examples of the divalent organic group of Q include groups represented by the following structures:

[Chem. 46]

[Chem. 47]

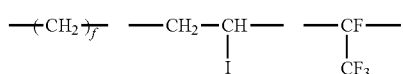

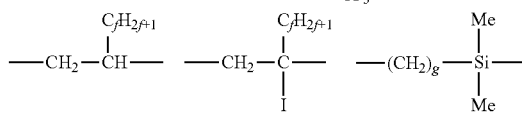

-continued

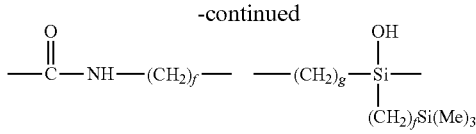

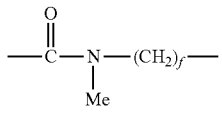

[Chem. 48]

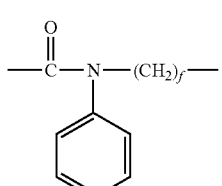

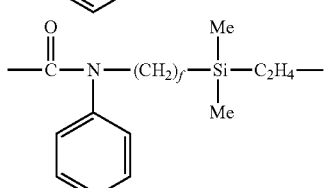

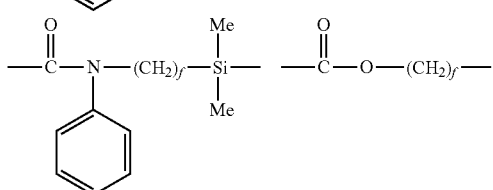

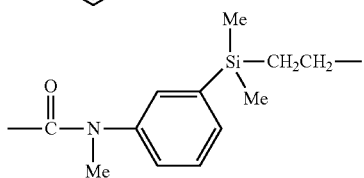

[Chem. 49]

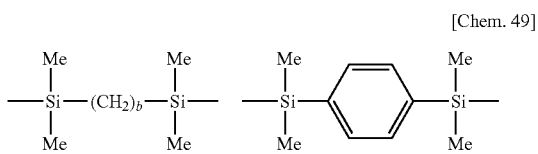

wherein f is an integer of 2 to 4, b is an integer of 2 to 6, preferably an integer of 2 to 4, u and v are integers of 1 to 4, g is an integer of 2 to 4, and Me is a methyl group.

In the above formulas (4) and (5), Y is each independently a divalent organic group having a hydrolyzable silyl group, and preferably has a structure represented by the following formula:

[Chem. 50]

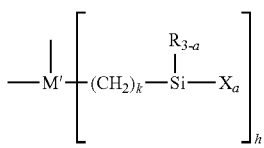

wherein R, X, and a are as described above. k is an integer of 0 to 10, preferably an integer of 0 to 8, and more preferably an integer of 0 to 2. h is an integer of 1 to 6, preferably 1 or 2, M' is an unsubstituted or substituted 3 to 8 valent, preferably 3 valent or 4 valent hydrocarbon group, a part or all of carbon atoms in the hydrocarbon group may be replaced by silicon atoms, and a part or all of hydrogen atoms bonded to the carbon atoms may be replaced by halogen atoms such as fluorine atoms.

M' is preferably a group represented by the following structure:

[Chem. 51]

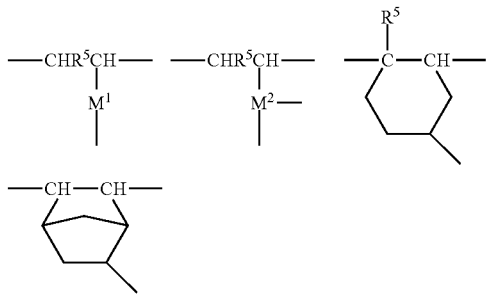

wherein $M^1$ is a single bond, an unsubstituted or substituted divalent hydrocarbon group having 1 to 6 carbon atoms, or a diorganosilylene group such as a dimethylsilylene group, $M^2$ is a 3 valent group represented by $-R^1C=$ or a 3 valent group represented by $-R^3Si=$, and $R^1$ and $R^3$ are the same as described above. $R^5$ is a hydrogen atom or a monovalent hydrocarbon group having 1 to 6 carbon atoms, such as an alkyl group including a methyl group, an ethyl group, or a propyl group.

Examples of $M^1$ include a single bond, a phenylene group, a dimethylsilylene group, and a tetrafluoroethylene group. In addition, examples of $M^2$ include one shown below:

[Chem. 52]

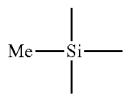

wherein Me is a methyl group.

Examples of such Y include the following groups:

[Chem. 53]

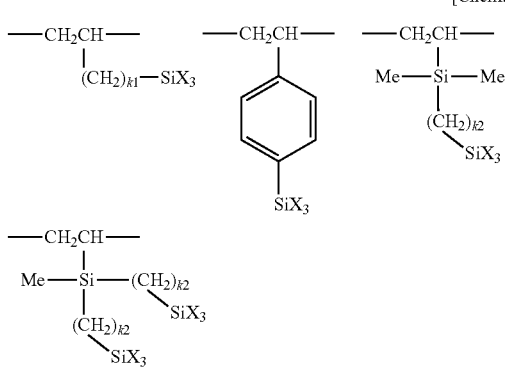

[Chem. 54]

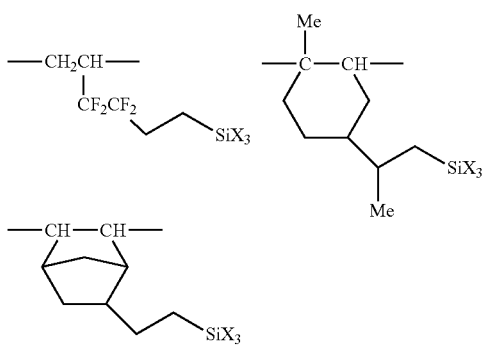

wherein X is the same as described above, k1 is an integer of 0 to 10, preferably an integer of 0 to 8, k2 is an integer of 2 to 10, preferably an integer of 2 to 8, and Me is a methyl group.

In the above formulas (4) and (5), 6 is independently an integer of 1 to 10, preferably an integer of 1 to 4.

In addition, B is each independently a hydrogen atom, an alkyl group having 1 to 4 carbon atoms such as a methyl group, an ethyl group, a propyl group, and a butyl group, or a halogen atom such as a fluorine atom, a chlorine atom, a bromine atom, and an iodine atom.

Examples of the hydrolyzable fluorine-containing organosilicon compound (hydrolyzable fluorinated organosilicon compound) represented by the above formulas (1) to (5) include the following structures:

[Chem. 55]

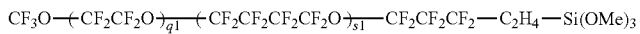

[Chem. 56]

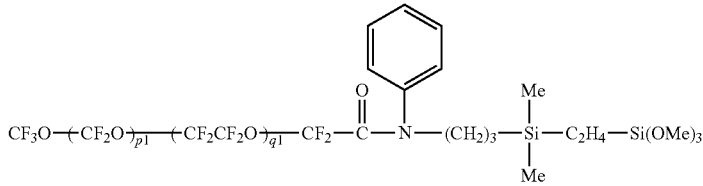

[Chem. 57]

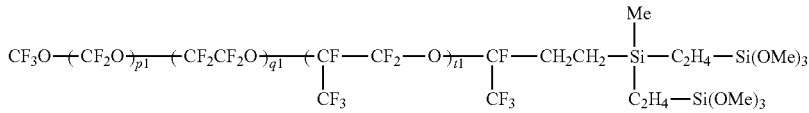

[Chem. 58]

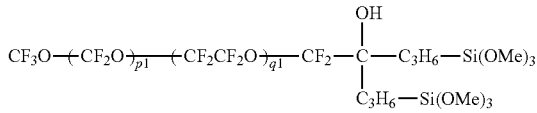

[Chem. 59]

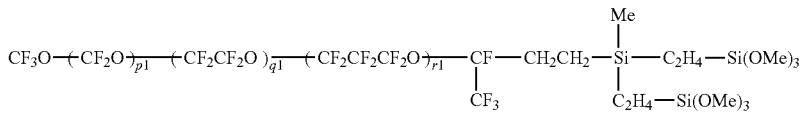

[Chem. 60]

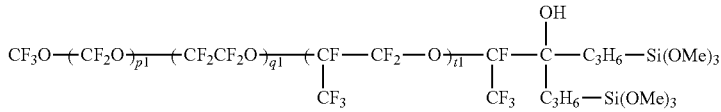

[Chem. 61]

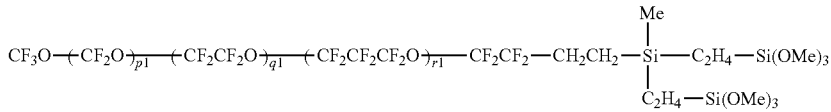

[Chem. 62]

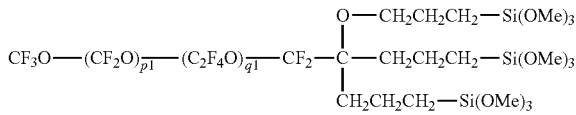

[Chem. 63]

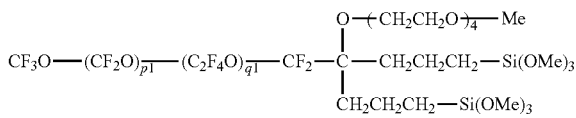

-continued
[Chem. 64]
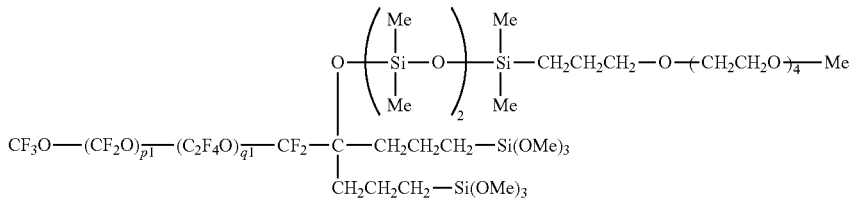
[Chem. 65]
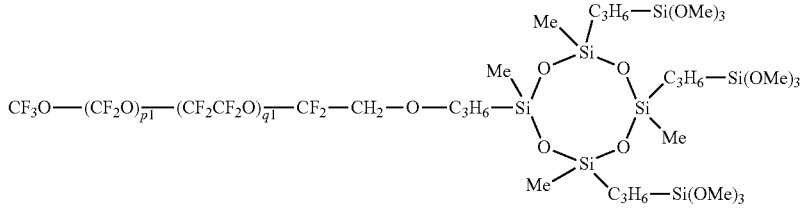
[Chem. 66]
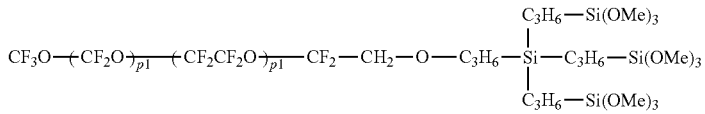
[Chem. 67]
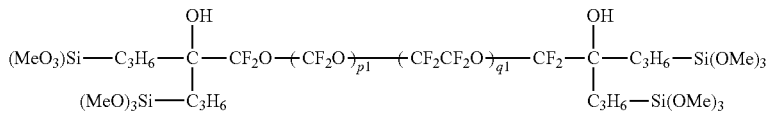
[Chem. 68]
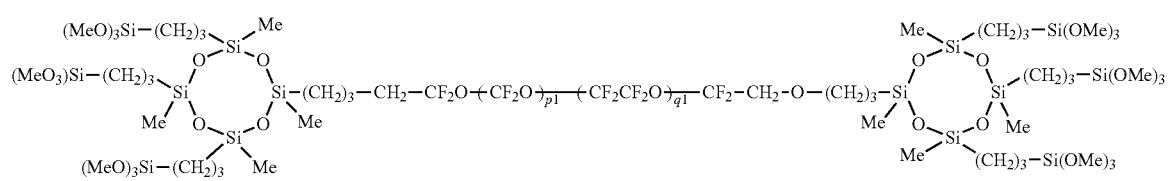
[Chem. 69]
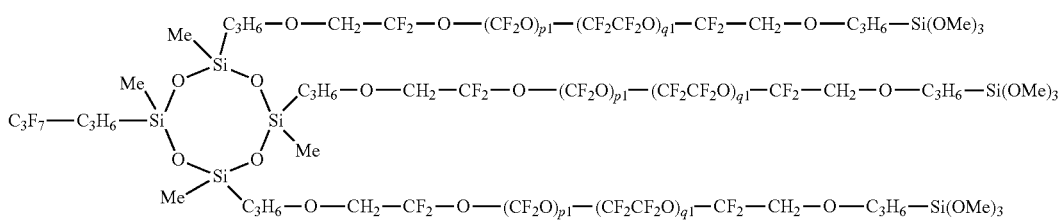
[Chem. 70]
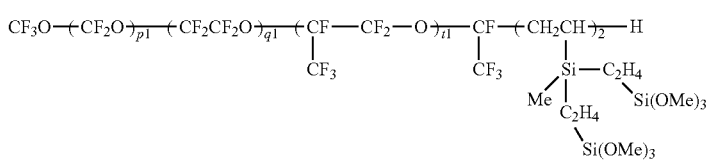
[Chem. 71]
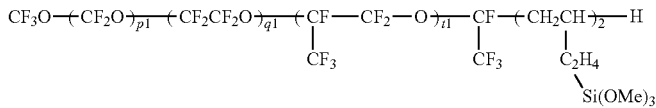
[Chem. 72]
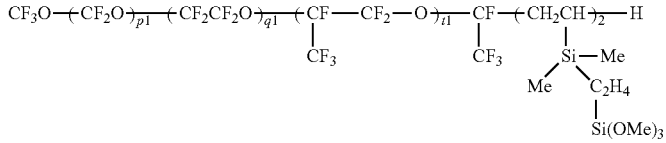

-continued

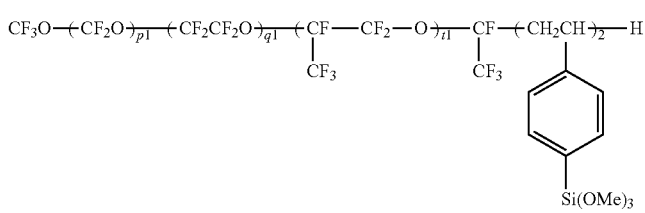
[Chem. 73]

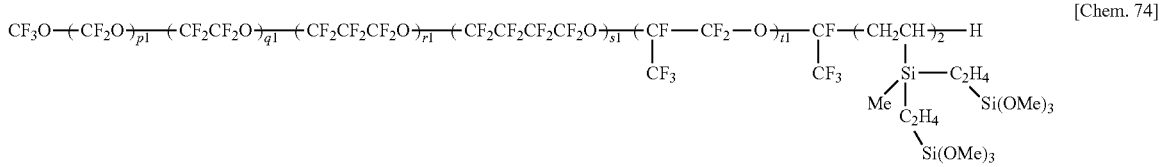
[Chem. 74]

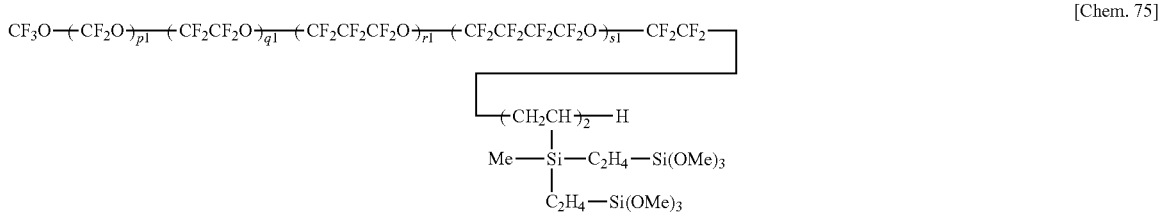
[Chem. 75]

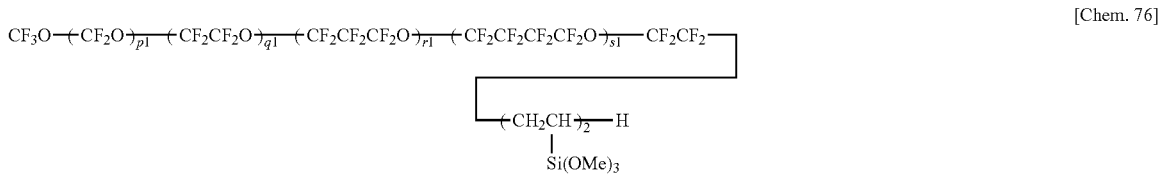
[Chem. 76]

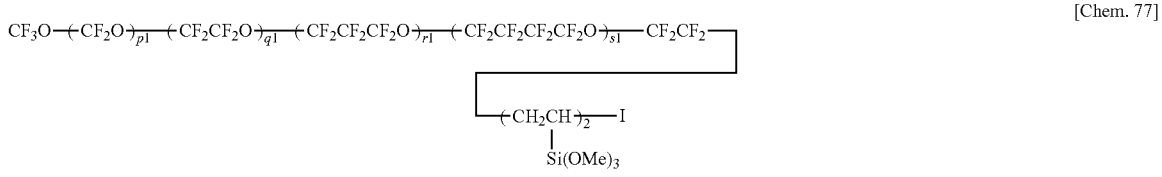
[Chem. 77]

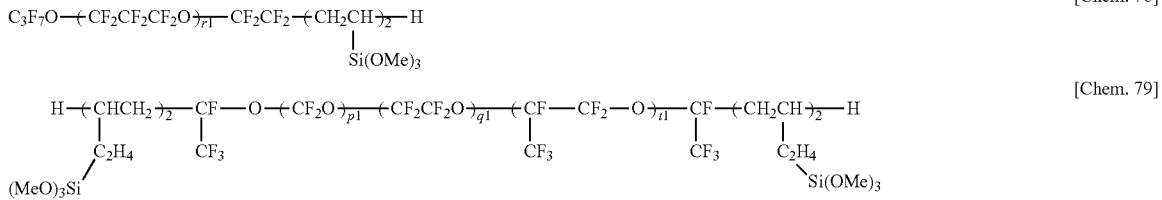
[Chem. 78]

[Chem. 79]

wherein, Me is a methyl group, p1, q1, r1, s1, and t1 are each independently an integer of 1 to 200, the sum of p1, q1, r1, s1, and t1 is 3 to 500, and each repeating unit shown in parentheses to which p1, q1, r1, s1, and t1 are attached may be randomly combined.

The hydrolyzable fluorine-containing organosilicon compound (hydrolyzable fluorinated organosilicon compound) represented by the general formulas (1) to (5) according to the present invention may include a compound in which a part or all of the hydrolyzable group (X) is hydrolyzed (compound in which X is an OH group), and may include a compound in which a part or all of the OH groups are condensed.

The hydrolyzable fluorine-containing organosilicon compound is desirable to be previously diluted with a solvent, and such a solvent is not particularly limited as long as it uniformly dissolves the hydrolyzable fluorine-containing organosilicon compound. Examples thereof include a fluorine-modified aliphatic hydrocarbon-based solvent (for example, perfluoroheptane and perfluorooctane), a fluorine-modified aromatic hydrocarbon-based solvent (for example, 1,3-trifluoromethylbenzene), a fluorine-modified ether-based solvent (for example, methyl perfluorobutyl ether, ethyl perfluorobutyl ether, and perfluoro(2-butyltetrahydrofuran)), a fluorine-modified alkylamine-based solvent (for example, perfluorotributylamine and perfluorotripentylamine), a hydrocarbon-based solvent (for example, petroleum benzine, toluene, and xylene), and a ketone-based solvent (for example, acetone, methyl ethyl ketone, and methyl isobutyl ketone). Of these, a fluorine-modified solvent is preferable from the viewpoint of solubility and stability, and a fluorine-modified ether-based solvent and a fluorine-modified aromatic hydrocarbon-based solvent are particularly preferable. The above solvent may be used singly or in combination of two or more. The solvent is desirable to be contained so that the percent by weight of the hydrolyzable fluorine-containing organosilicon compound in the antifouling coating agent (solution including the hydrolyzable fluorine-containing organosilicon compound and the solvent) is 0.01 to 50% by weight, preferably 0.03 to 10% by weight, and more preferably 0.05 to 1% by weight.

The antifouling coating agent containing the hydrolyzable fluorine-containing organosilicon compound can be applied onto a substrate by a known method such as a wet coating method (brush application, spray, dipping, spin, ink jet) or a vapor deposition method. The application conditions and the like may be in accordance with a conventionally known method; however, the silica layer is applied by the wet coating method, and therefore it is more efficient to apply the hydrolyzable fluorine-containing organosilicon compound by the wet coating method. The hydrolyzable fluorine-containing organosilicon compound can be cured while the solvent is removed by drying at room temperature (25° C.) for 1 to 24 hours, and may be heated at 30 to 200° C. for 10 minutes to 1 hour for curing in a shorter time. Curing is preferably performed under humidification (50 to 90% RH) in order to promote hydrolysis.

Before applying the antifouling coating agent containing the hydrolyzable fluorine-containing organosilicon compound, the surface of the silica layer on the substrate may be subjected to cleaning such as plasma treatment, UV treatment, or ozone treatment, or treatment for activating the surface.

The thickness of the fluorine layer (water/oil-repellent layer) of the alkali-resistant water-repellent member of the present invention is 0.5 to 30 nm, and particularly preferably 1 to 20 nm. If the thickness is too thick, the treatment agent may aggregate to deteriorate visibility, and if the thickness is too thin, surface characteristics and abrasion resistance may not be sufficient.

The thus obtained alkali-resistant water-repellent member of the present invention can improve the alkali resistance and abrasion resistance of the water/oil-repellent layer.

Examples of the alkali-resistant water-repellent member of the present invention obtained as described above include: a housing and a display of, for example, a car navigation system, a tablet PC, a smartphone, a mobile phone, a digital camera, a digital video camera, a PDA, a portable audio player, a car audio system, and a game machine; medical instruments such as spectacle lenses, camera lenses, sunglasses, and stomach cameras; optical articles such as copiers, PCs, liquid crystal displays, organic EL displays, plasma displays, protective films, and antireflection films; water-surrounding articles such as a tub, a shower head, a faucet (water washing metal fitting), a wash basin, and a kitchen sink; sanitary equipment and kitchen equipment; window glass and headlamp cover for, for example, automobiles, trains, and aircraft; construction materials for outer wall such as artificial marble; kitchen building materials; waiting room; art products and the like; compact disc, DVD, and the like; and grease filter, drain of air conditioner, and body of transportation equipment.

EXAMPLES

Hereinafter, the present invention is specifically described with reference to Examples and Comparative Examples; however, the present invention is not limited thereto.

Examples 1 to 7 and Comparative Examples 1 to 4

[Formation of Silica Layer]

A treatment solution having a composition shown in Table 1 was applied onto SUS 304 (SUS 304 (BA) manufactured by Standard Test Piece Co., Ltd., test piece substrate having a thickness of 1 mm, a width of 50 mm, and a length of 100 mm) by dip applying (immersion for 30 seconds, pulling up at 2.5 mm/sec), and dried at 150° C. for 30 minutes to produce a substrate on which a silica layer of Examples 1 to 7 and Comparative Examples 1 and 2 and a hydrolysis/partial condensate layer (primer layer) of tetraethoxysilane of Comparative Example 3 were formed. The coating film thickness was estimated by measuring a fluorescent X-ray Si detection amount.

TABLE 1

| | Blend composition (wt %) | Silica nano-particles (A) | Silica nano-particles (B) | Silica nano-particles (C) | TEOS (A) | TEOS (B) | Platinum nano-particles (A) | Platinum nano-particles (B) | Platinum nano-particles (C) | Solvent |
|---|---|---|---|---|---|---|---|---|---|---|
| Example 1 | Treatment solution 1 | 0.126 | | | 0.010 | | | | | 99.864 |
| Example 2 | Treatment solution 2 | | 0.126 | | 0.010 | | | | | 99.864 |
| Example 3 | Treatment solution 3 | | | 0.126 | 0.010 | | | | | 99.864 |
| Example 4 | Treatment solution 4 | 0.252 | | | 0.010 | | | | | 99.738 |
| Example 5 | Treatment solution 5 | 0.126 | | | 0.010 | | 0.036 | | | 99.828 |
| Example 6 | Treatment solution 6 | 0.126 | | | 0.010 | | | 0.036 | | 99.828 |
| Example 7 | Treatment solution 7 | 0.126 | | | 0.010 | | | | 0.036 | 99.828 |
| Comparative Example 1 | Treatment solution 8 | 0.126 | | | | 0.010 | | | | 99.864 |

TABLE 1-continued

| | Blend composition (wt %) | Silica nano-particles (A) | Silica nano-particles (B) | Silica nano-particles (C) | TEOS (A) | TEOS (B) | Platinum nano-particles (A) | Platinum nano-particles (B) | Platinum nano-particles (C) | Solvent |
|---|---|---|---|---|---|---|---|---|---|---|
| Comparative Example 2 | Treatment solution 9 | 0.126 | | | | | | | | 99.874 |
| Comparative Example 3 | Treatment solution 10 | | | | 0.500 | | | | | 99.500 |

Silica nanoparticles (A): nanosilica having an average particle size of 2 nm
Silica nanoparticles (B): nanosilica having an average particle size of 10 nm
Silica nanoparticles (C): nanosilica having an average particle size of 20 nm
TEOS (A): Hydrolysis/partialcondensate of tetraethoxy silane (mass average molecular weight: 25,000, silanol group weight: 0.01 mol/g)
TEOS (B): tetraethoxysilane
Platinum nanoparticles (A): nanoplatinum having an average particle size of 10 nm
Platinum nanoparticles (B): nanoplatinum having an average particle size of 5 nm
Platinum nanoparticles (C): nanoplatinum having an average particle size of 20 nm Herein, the average particle size is a cumulative volume mean size D50 in particle size distribution measurement by a laser beam diffraction method. As the solvent, pure water was used for the treatment solutions 1 to 9, and butanol was used for the treatment solution 10.

Furthermore, a water/oil-repellent layer was formed on the substrate on which the silica layers of Examples 1 to 7 and Comparative Examples 1 and 2 and the primer layer of Comparative Example 3 were formed based on the following method. In Comparative Example 4, a water/oil-repellent layer was directly formed on the SUS 304 test piece (test piece substrate) on which the primer layer was not formed without applying the treatment solution.

[Formation of Water/Oil-Repellent Layer]

Compound 1 shown below was diluted with a fluorine-modified ether-based solvent (Novec7200 (ethyl perfluorobutyl ether manufactured by 3M Co., Ltd.)) so as to have a solid content of 0.1% by weight, and then spray applied onto each of the substrates by using a spray applying apparatus (NST-51 manufactured by T & K Co., Ltd.). Thereafter, curing was performed at 120° C. for 30 minutes to form a cured film as a water/oil-repellent layer on the outer surface of the substrate on which the primer layer was formed (or not formed), thereby producing test pieces of Examples 1 to 7 and Comparative Examples 1 to 4. The average film thickness of the water/oil-repellent layer was calculated from the amount of F detected by the fluorescent X-ray apparatus (ZSXmini2 manufactured by Rigaku Corporation).

[Compound 1]

[Chem. 80]

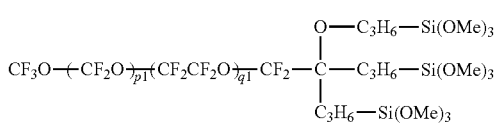

$p1 + q1 = 38$ wherein Me is a methyl group.

The film thicknesses of the silica layer (one surface) and the water/oil-repellent layer are shown in Table 2.

TABLE 2

| | Treatment solution | Film thickness of silica layer (nm) | Film thickness of water/oil-repellent layer (nm) |
|---|---|---|---|
| Example 1 | Treatment solution 1 | 12 | 15 |
| Example 2 | Treatment solution 2 | 12 | 14 |
| Example 3 | Treatment solution 3 | 15 | 14 |
| Example 4 | Treatment solution 4 | 25 | 13 |
| Example 5 | Treatment solution 5 | 12 | 15 |
| Example 6 | Treatment solution 6 | 12 | 15 |
| Example 7 | Treatment solution 7 | 12 | 14 |
| Comparative Example 1 | Treatment solution 8 | 13 | 15 |
| Comparative Example 2 | Treatment solution 9 | 10 | 14 |
| Comparative Example 3 | Treatment solution 10 | 20 | 13 |
| Comparative Example 4 | — | — | 14 |

Using each of the test pieces obtained above, various evaluations were performed by the following method. These results are shown in Table 3.

[Water/Oil-Repellent Property]

The contact angle of the cured film against water and the contact angle against oleic acid were measured by using a contact angle meter (DropMaster manufactured by Kyowa Interface Science Co., Ltd.).

[Magic Wipability]

Wipability when magic ink (Hi-Mckee manufactured by ZEBRA Corporation) was applied onto a cured film and wiped with BEMCOT (manufactured by Asahi Kasei Corporation) was evaluated according to the following evaluation criteria.

A: stain can be easily wiped off
B: stain can be wiped off
C: magic ink slightly remains after wiping off the stain
D: stain cannot be wiped off

[Alkali Resistance]

The substrate was immersed in a 0.4% by weight aqueous solution of sodium hydroxide at 55° C. for 4 hours. After a lapse of 24 hours, the substrate was taken out, washed with tap water, and then wiped with tissue paper. The contact angle of the washed substrate against water was measured by the same method as described above, and the alkali resistance of the cured film was evaluated according to the following criteria.

◯: a decrease in water contact angle falls within a range of 10° or less
x: a decrease in water contact angle does not fall within the range of 10° or less

TABLE 3

| | Treatment solution | Water/oil-repellent property | | | Alkali resistance | |
|---|---|---|---|---|---|---|
| | | Water contact angle (°) | Oleic acid contact angle (°) | Magic wipability | Water contact angle (°) | Evaluation |
| Example 1 | Treatment solution 1 | 114 | 73 | A | 112 | ○ |
| Example 2 | Treatment solution 2 | 113 | 73 | A | 111 | ○ |
| Example 3 | Treatment solution 3 | 114 | 75 | A | 110 | ○ |
| Example 4 | Treatment solution 4 | 114 | 74 | A | 112 | ○ |
| Example 5 | Treatment solution 5 | 113 | 72 | A | 112 | ○ |
| Example 6 | Treatment solution 6 | 112 | 72 | A | 111 | ○ |
| Example 7 | Treatment solution 7 | 113 | 73 | A | 112 | ○ |
| Comparative Example 1 | Treatment solution 8 | 111 | 68 | B | 90 | X |
| Comparative Example 2 | Treatment solution 9 | 112 | 70 | A | 108 | ○ |
| Comparative Example 3 | Treatment solution 10 | 115 | 73 | A | 100 | X |
| Comparative Example 4 | — | 108 | 68 | B | 41 | X |

As is apparent from the results in Table 3, Examples 1, 2, 3, 4, 5, 6, and 7 and Comparative Example 2 exhibited excellent water repellency of 100° or more after the alkali resistance test, and the decrease in the water contact angle from the initial stage was in the range of 10° or less. However, in Comparative Example 1 using triethoxysilane (TEOS (B)) as a monomer not hydrolyzed (having no silanol group) and Comparative Examples 3 and 4 without using silica nanoparticles, the water repellency significantly decreased after the alkali resistance test. Particularly, in Comparative Example 4, it was found that the contact angle was significantly decreased, and the alkali resistance was the lowest.

In addition, in the case of using silica nanoparticles having an average particle size of 20 nm (Example 3) and in the case of using no hydrolysis/dehydration condensation compound of triethoxysilane (TEOS (A)) (Comparative Example 2), the average particle size was 10 nm or less, and the decrease in water repellency was large as compared with Examples 1, 2, 4, 5, 6, and 7 using TEOS (A). It is suggested that smaller silica nanoparticles have better adhesiveness to the substrate, and the adhesiveness to the substrate is better if a hydrolysis/dehydration condensation compound of triethoxysilane having a silanol group is used. Furthermore, the addition of platinum nanoparticles (Examples 5, 6, and 7) did not significantly affect the surface characteristics and abrasion resistance, and therefore various nanoparticles can be mixed.

[Abrasion Resistance (Wet Abrasion Test)]

The substrates of Examples 1 to 7 and Comparative Example 2 in which the alkali resistance test evaluation was ○ were newly produced again by the same method as described above, and the wet abrasion test of the cured film was performed under the following conditions by using a reciprocating abrasion tester (HEIDON 30S manufactured by Shinto Scientific Co., Ltd.).

The contact angle of the cured film against water after the wet abrasion test was measured by using a contact angle meter (DropMaster manufactured by Kyowa Interface Science Co., Ltd.), and evaluated according to the following criteria. The results are shown in Table 4. The initial water/oil-repellent property (water contact angle and oleic acid contact angle) before the wet abrasion test and the results of the magic ink wipeability are also shown in Table 4.

Evaluation Environmental Conditions:
  25° C. and humidity 40%
Rubbing material: a wetted sponge was fixed with a rubber band to the tip of the tester (20 mm×20 mm×20 mm) that was in contact with the sample.
Load: 500 g
Rubbing distance (one way): 30 mm
Rubbing speed: 3,600 mm/min
Number of reciprocations: 500 reciprocations
  ○: a decrease in water contact angle falls within a range of 10° or less.
  x: a decrease in water contact angle does not fall within the range of 10° or less.

TABLE 4

| | Treatment solution | Water/oil-repellent property | | | Wet abrasion resistance | |
|---|---|---|---|---|---|---|
| | | Water contact angle (°) | Oleic acid contact angle (°) | Magic wipability | Water contact angle (°) | Evaluation |
| Example 1 | Treatment solution 1 | 114 | 73 | A | 109 | ○ |
| Example 2 | Treatment solution 2 | 113 | 73 | A | 108 | ○ |

TABLE 4-continued

| | Treatment solution | Water/oil-repellent property | | | Wet abrasion resistance | |
|---|---|---|---|---|---|---|
| | | Water contact angle (°) | Oleic acid contact angle (°) | Magic wipability | Water contact angle (°) | Evaluation |
| Example 3 | Treatment solution 3 | 114 | 75 | A | 106 | ○ |
| Example 4 | Treatment solution 4 | 114 | 74 | A | 106 | ○ |
| Example 5 | Treatment solution 5 | 113 | 72 | A | 109 | ○ |
| Example 6 | Treatment solution 6 | 112 | 72 | A | 107 | ○ |
| Example 7 | Treatment solution 7 | 113 | 73 | A | 108 | ○ |
| Comparative Example 2 | Treatment solution 9 | 112 | 70 | A | 98 | X |

As is apparent from the results in Table 4, Examples 1, 2, 3, 4, 5, 6, and 7 exhibited excellent water repellency before and after the wet abrasion test; however, Comparative Example 2 in which the hydrolysis/dehydration condensation compound of triethoxysilane (TEOS (A)) was not used had a large decrease in water repellency after the wet abrasion test.

From the above results, it was found that the alkali resistance and wet abrasion resistance of the cured film can be improved by a water-repellent member in which there is formed a silica layer using an organosilicon compound obtained by hydrolysis/dehydration condensate as an organosilicon compound having silica nanoparticles and a plurality of silanol groups in the molecule.

INDUSTRIAL APPLICABILITY

The present invention can provide an alkali-resistant water-repellent member having a cured film excellent in water/oil-repellent property. Furthermore, the cured film has both alkali resistance and abrasion resistance. Therefore, the alkali-resistant water-repellent member of the present invention is particularly significantly effective for applications where adhesion of water or oil is assumed, and can maintain a good antifouling surface over a long period of time in a housing of an electronic device or anything around a kitchen, which is often used and touched on a daily basis.

The invention claimed is:

1. An alkali-resistant water-repellent member, comprising:
   a substrate having surfaces;
   a silica layer disposed on at least one side surface of the substrate surfaces, containing at least 50% by weight of silica nanoparticles and at least 1% by weight of an organosilicon compound having a plurality of silanol groups in a molecule, and having a thickness of 1 nm to 5 μm; and
   a water/oil repellent layer disposed on an outer surface of the silica layer, composed mainly of a cured product of a hydrolyzable fluorine-containing organosilicon compound, and having a thickness of 0.5 to 30 nm;
   wherein the organosilicon compound having a plurality of silanol groups in a molecule, is a hydrolysis/partial condensate of tetraalkoxysilane, which has a silanol group amount of 0.001 to 0.5 mol in the molecule, and a mass average molecular weight of 5,000 to 50,000; and wherein the hydrolyzable fluorine-containing organosilicon compound is at least one selected from hydrolyzable fluorine-containing organosilicon compounds having the following general formulas (1) to (5):

$$(A-Rf)_\alpha—ZW_\beta \quad (1)$$

$$Rf—(ZW_\beta)_2 \quad (2)$$

$$Z'—(Rf—ZW_\beta)_\gamma \quad (3)$$

wherein Rf is independently a divalent linear perfluorooxyalkylene polymer residue having $—(CF_2)_d—O—(CF_2O)_p(CF_2CF_2O)_q(CF_2CF_2CF_2O)_r(CF_2CF_2CF_2CF_2O)_s(CF(CF_3)\ CF_2O)_t—(CF_2)_{d'}—$, d is independently an integer of 0 to 8, p, q, r, s, and t are each independently an integer of 0 to 200 and the sum of p+q+r+s+t is an integer of 3 to 500, each repeating unit in parentheses to which p, q, r, s, and t are attached may be randomly combined, A is independently a fluorine atom, a hydrogen atom, or a monovalent fluorine-containing group whose terminal is a $—CF_3$ group, a $—CF_2H$ group, or a $—CH_2F$ group, Z and Z' are independently a single bond or a 2- to 8-valent organic group optionally including a nitrogen atom, an oxygen atom, a silicon atom, a phosphorus atom, or a sulfur atom and optionally substituted with fluorine, W is independently a monovalent organic group having a hydrolyzable silyl group at the terminal, α and β are each independently an integer of 1 to 7, and the sum of α+β is an integer of 2 to 8, γ is an integer of 2 to 8, $$A-Rf-Q-(Y)_\delta—B \quad (4)$$

$$Rf-(Q-(Y)_\delta—B)_2 \quad (5)$$

wherein Rf and A are the same as described above,

Q is independently a single bond or divalent organic group,

δ is independently an integer of 1 to 10,

Y is independently a divalent organic group having a hydrolyzable silyl group, and B is independently a hydrogen atom, an alkyl group having 1 to 4 carbon atoms, or a halogen atom.

2. The alkali-resistant water-repellent member according to claim 1, wherein the silica nanoparticles have an average particle size of up to 30 nm.

3. The alkali-resistant water-repellent member according to claim 1, wherein the silica layer containing at least 50% by weight of silica nanoparticles and at least 1% by weight of an organosilicon compound having a plurality of silanol groups in a molecule further contains 0.1 to 49% by weight of nanoparticles of at least one type selected from titanium oxide nanoparticles, platinum nanoparticles, and tin oxide nanoparticles having an average particle size of up to 30 nm.

4. The alkali-resistant water-repellent member according to claim 1, wherein the hydrolyzable fluorine-containing organosilicon compound having any one of the general formulas (1) to (5) is at least one selected from the following compounds:

[Chem. 1]

[Chem. 2]
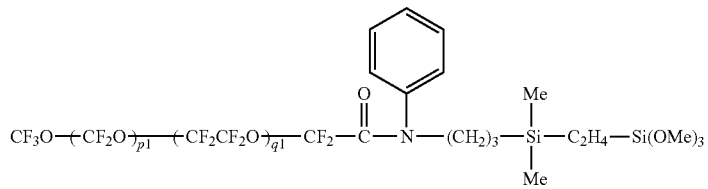

[Chem. 3]
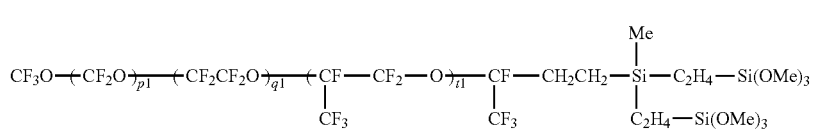

[Chem. 4]
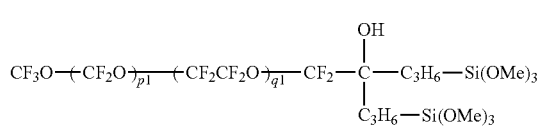

[Chem. 5]
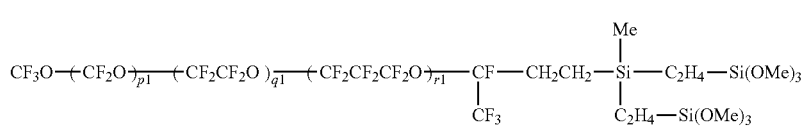

[Chem. 6]
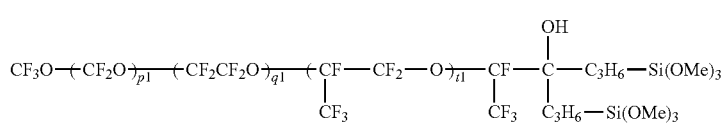

[Chem. 7]
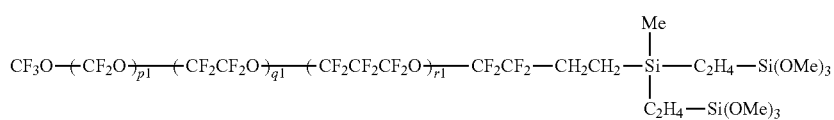

[Chem. 8]
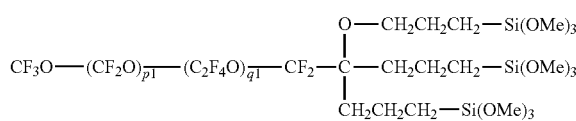

[Chem. 9]
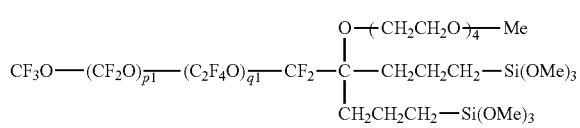

[Chem. 10]
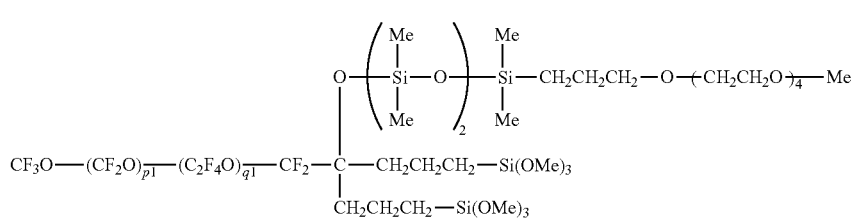

[Chem. 11]
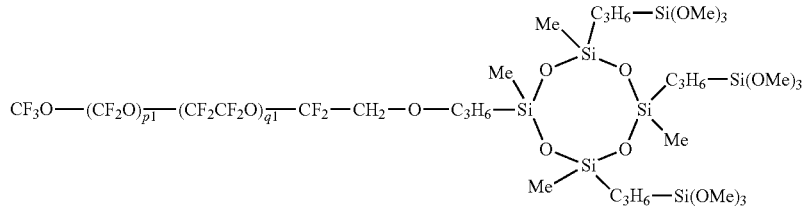
[Chem. 12]
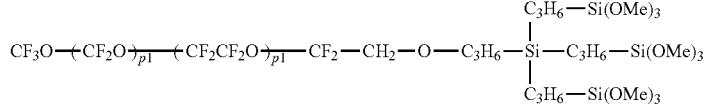
[Chem. 13]
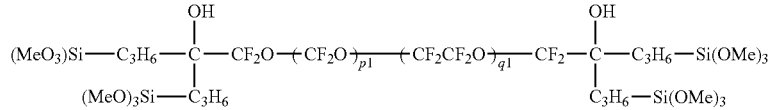
[Chem. 14]
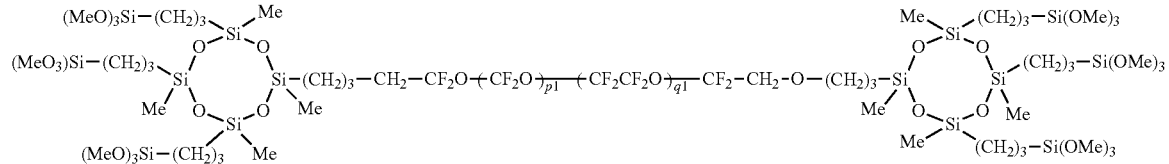
[Chem. 15]
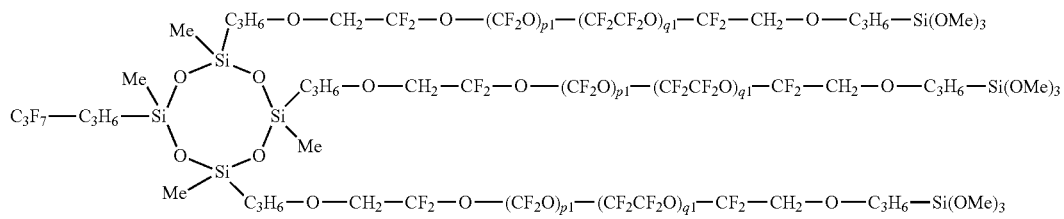
[Chem. 16]
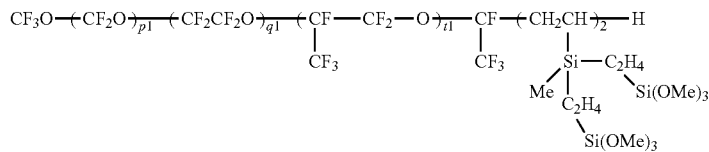
[Chem. 17]
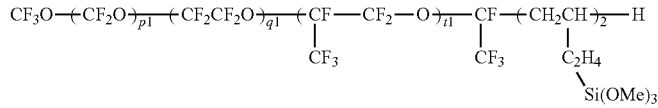
[Chem. 18]
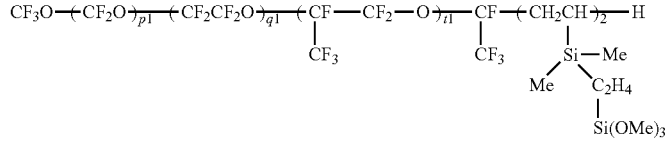
[Chem. 19]
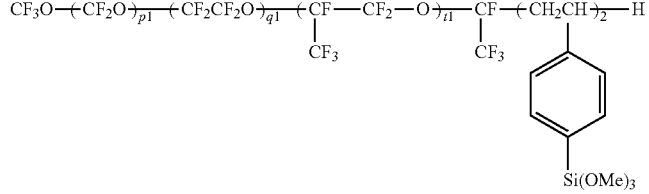

-continued

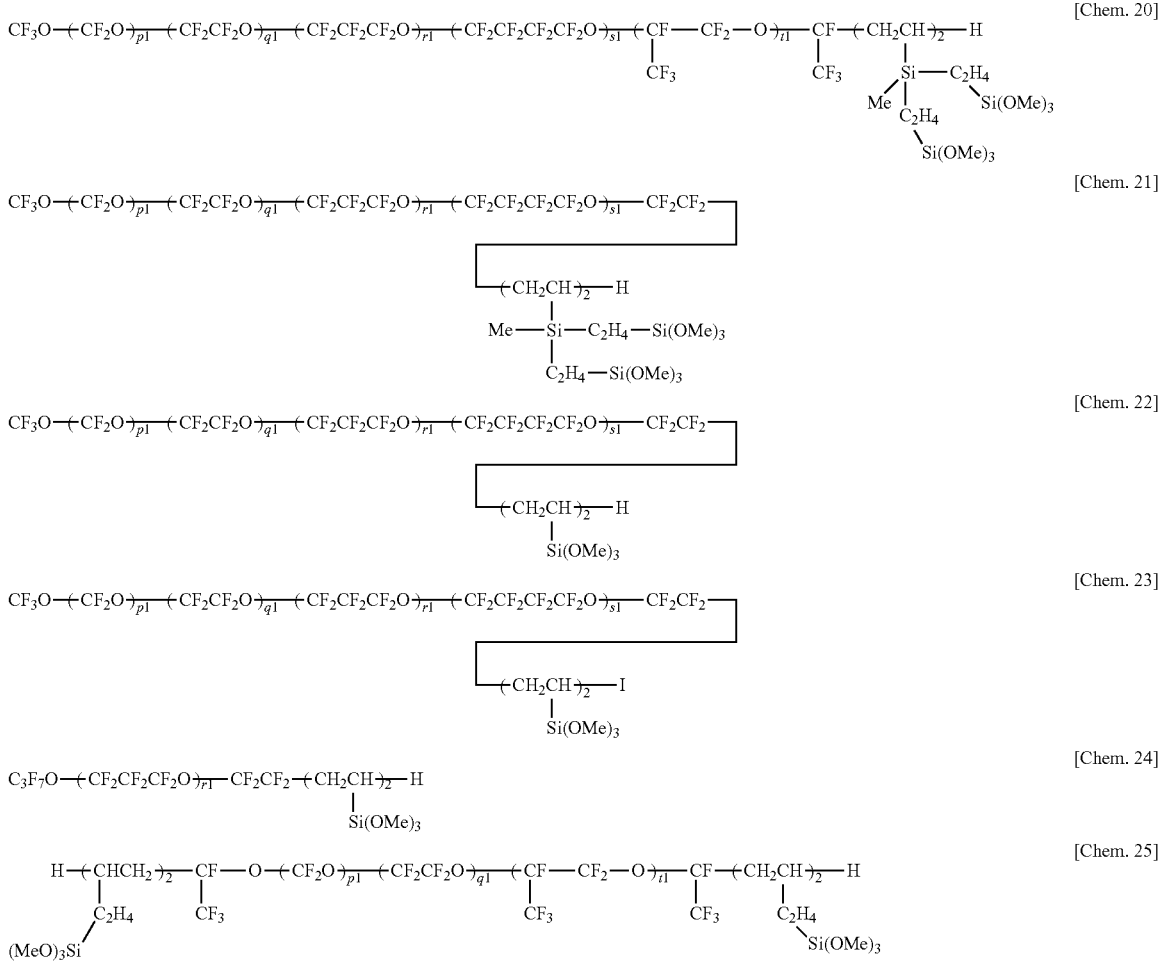

wherein Me is a methyl group, p1, q1, r1, s1, and t1 are each independently an integer of 1 to 200, the sum of p1, q1, r1, s1, and t1 is 3 to 500, and each repeating unit shown in parentheses to which p1, q1, r1, s1, and t1 are attached may be randomly combined.

5. The alkali-resistant water-repellent member according to claim 1, wherein the substrate is made of metal oxide, metal, resin, ceramic, quartz, glass, sapphire, or diamond.

6. A method for producing the alkali-resistant water-repellent member according to claim 1, the method comprising the steps of:
wet coating a dispersion of the silica nanoparticles and the organosilicon compound having a plurality of silanol groups in a molecule, in a solvent onto the at least one side surface of the substrate having surfaces;
drying the wet-coated dispersion to remove the solvent and to form the silica layer;
wet coating a solution of the hydrolyzable fluorine-containing organosilicon compound in a solvent onto the outer surface of the silica layer; and
drying the wet-coated solution to remove the solvent and to cure the hydrolyzable fluorine-containing organosilicon compound, thereby forming the water/oil repellent layer.

7. A method for improving alkali resistance and abrasion resistance of a water-repellent member, characterized by a step of:

providing a silica layer containing at least 50% by weight of silica nanoparticles and at least 1% by weight of an organosilicon compound having a plurality of silanol groups in a molecule, and having a thickness of 1 nm to 5 μm,
between a substrate and a water/oil repellent layer composed mainly of a cured product of a hydrolyzable fluorine-containing organosilicon compound and having a thickness of 0.5 to 30 nm,
wherein the organosilicon compound having a plurality of silanol groups in a molecule, is a hydrolysis/partial condensate of tetraalkoxysilane, which has a silanol group amount of 0.001 to 0.5 mol in the molecule, and a mass average molecular weight of 5,000 to 50,000; and
wherein the hydrolyzable fluorine-containing organosilicon compound is at least one selected from hydrolyzable fluorine-containing organosilicon compounds having the following general formulas (1) to (5):

  (1)

  (2)

  (3)

wherein Rf is independently a divalent linear perfluorooxyalkylene polymer residue having —(CF$_2$)$_d$—O—

$(CF_2O)_p(CF_2CF_2O)_q(CF_2CF_2CF_2O)_r$
$(CF_2CF_2CF_2CF_2O)_s(CF(CF_3)CF_2O)_t$—$(CF_2)_d$—, d is independently an integer of 0 to 8, p, q, r, s, and t are each independently an integer of 0 to 200 and the sum of p+q+r+s+t is an integer of 3 to 500, each repeating unit in parentheses to which p, q, r, s, and t are attached may be randomly combined, A is independently a fluorine atom, a hydrogen atom, or a monovalent fluorine-containing group whose terminal is a —$CF_3$ group, a —$CF_2H$ group, or a —$CH_2F$ group, Z and Z' are independently a single bond or a 2- to 8-valent organic group optionally including a nitrogen atom, an oxygen atom, a silicon atom, a phosphorus atom, or a sulfur atom and optionally substituted with fluorine, W is independently a monovalent organic group having a hydrolyzable silyl group at the terminal, α and β are each independently an integer of 1 to 7, and the sum of α+β is an integer of 2 to 8, γ is an integer of 2 to 8, A-Rf-Q-(Y)$_δ$—B  (4)

Rf-(Q-(Y)$_δ$—B)$_2$  (5)

wherein Rf and A are the same as described above,

Q is independently a single bond or divalent organic group,

β is independently an integer of 1 to 10,

Y is independently a divalent organic group having a hydrolyzable silyl group, and B is independently a hydrogen atom, an alkyl group having 1 to 4 carbon atoms, or a halogen atom.

\* \* \* \* \*